(12) United States Patent
Bell et al.

(10) Patent No.: US 7,571,934 B2
(45) Date of Patent: Aug. 11, 2009

(54) SEAT BELT SYSTEM FOR ADULTS AND CHILDREN

(75) Inventors: John Bell, Carlisle (GB); Martyn Palliser, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 12/212,751

(22) Filed: Sep. 18, 2008

(65) Prior Publication Data

US 2009/0091115 A1    Apr. 9, 2009

(30) Foreign Application Priority Data

Oct. 3, 2007   (EP) ................................ 07019391
May 30, 2008  (EP) ................................ 08009918

(51) Int. Cl.
*B60R 22/00* (2006.01)

(52) U.S. Cl. ................................ 280/801.1; 280/801.2

(58) Field of Classification Search .............. 280/801.2, 280/801.1, 802, 804, 808; 297/468, 469, 297/474, 483
See application file for complete search history.

(56) References Cited

U.S. PATENT DOCUMENTS

| | | | |
|---|---|---|---|
| 4,597,546 A | 7/1986 | Yamamoto et al. | |
| 4,710,423 A | 12/1987 | Imamura | |
| 4,730,875 A * | 3/1988 | Yoshitsugu | ................. 297/468 |
| 4,799,737 A | 1/1989 | Greene | |
| 4,817,885 A | 4/1989 | Matsumoto | |
| 5,020,856 A * | 6/1991 | George | ........................ 297/483 |
| 5,733,013 A * | 3/1998 | Brown | ......................... 297/483 |
| 5,830,811 A | 11/1998 | Tang et al. | |
| 5,899,402 A | 5/1999 | Koning | |
| 5,967,440 A | 10/1999 | Marshall | |

(Continued)

FOREIGN PATENT DOCUMENTS

EP    0888936 A    1/1999

(Continued)

*Primary Examiner*—Faye M. Fleming
(74) *Attorney, Agent, or Firm*—Lonnie Drayer

(57) ABSTRACT

A seat belt system for adults and children has a strap (55) that extends vertically along the front surface of a seat back or a structural pillar at the side of a vehicle. Seat belt webbing (19) is configured to provide a three-point seat belt system. The seat belt webbing passes through a stationary seat belt webbing guide (50) located higher than the shoulder of an adult seat occupant and attached to the same component of the vehicle as the vertically extending strap (55). A movable seat belt webbing guide (65) is movable along the strap (55). The stationary seat belt webbing guide (50) has a stationary seat belt webbing passageway (53) through which the seat belt webbing (19) passes and the movable seat belt webbing guide (65) has a seat belt webbing passageway (67) through which the seat belt webbing (19) passes. The seat belt webbing passageway of the movable seat belt webbing guide (65) can be vertically aligned with the stationary seat belt webbing passageway (53) of the stationary seat belt webbing guide (50) when an adult occupies the vehicle seat and the seat belt webbing passageway of the movable seat belt webbing guide (65) can be vertically spaced from the seat belt webbing passageway of the stationary seat belt webbing guide (50) when a child occupies the vehicle seat. A vehicle seat can be assembled with the seat belt system for adults and children.

34 Claims, 23 Drawing Sheets

U.S. PATENT DOCUMENTS

| | | | |
|---|---|---|---|
| 6,042,041 A | 3/2000 | Foster et al. | |
| 6,057,252 A | 5/2000 | Tang et al. | |
| 6,065,706 A | 5/2000 | Koning | |
| 6,460,935 B1 | 10/2002 | Rees et al. | |
| 6,631,926 B2 * | 10/2003 | Merrick et al. | 280/804 |
| 6,676,219 B1 * | 1/2004 | Brewer | 297/485 |
| 6,695,243 B2 | 2/2004 | Specht | |
| 6,705,558 B2 | 3/2004 | Specht et al. | |
| 6,733,041 B2 | 5/2004 | Arnold et al. | |
| 6,782,587 B2 * | 8/2004 | Reilly | 24/198 |
| 6,969,022 B2 | 11/2005 | Bell et al. | |
| 6,991,850 B2 | 1/2006 | Hurst et al. | |
| 2002/0003347 A1 * | 1/2002 | Merrick et al. | 280/804 |
| 2004/0239094 A9 * | 12/2004 | Herrmann et al. | 280/808 |
| 2008/0100051 A1 | 5/2008 | Bell et al. | |
| 2008/0122214 A1 | 5/2008 | Bell et al. | |

FOREIGN PATENT DOCUMENTS

| | | |
|---|---|---|
| GB | 2015321 A | 9/1979 |
| GB | 2230938 A | 11/1990 |
| GB | 2441496 A | 3/2008 |
| GB | 2441520 A | 3/2008 |
| JP | 53-018723 U | 2/1978 |
| KR | 10-1997-0026560 A | 6/1997 |

* cited by examiner

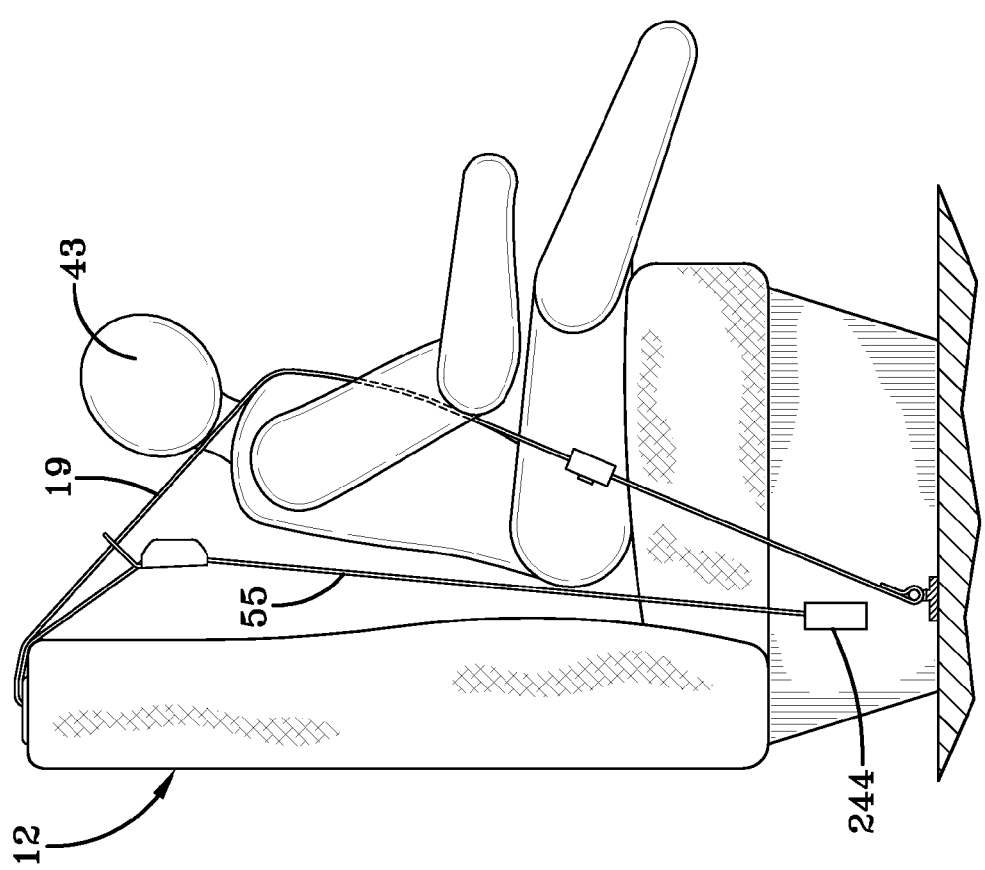

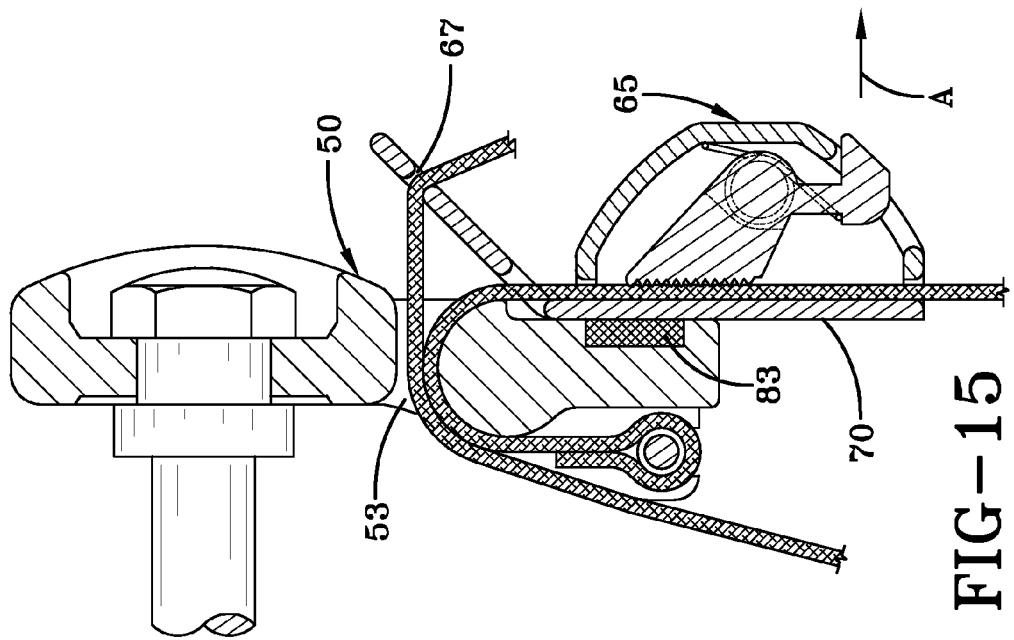
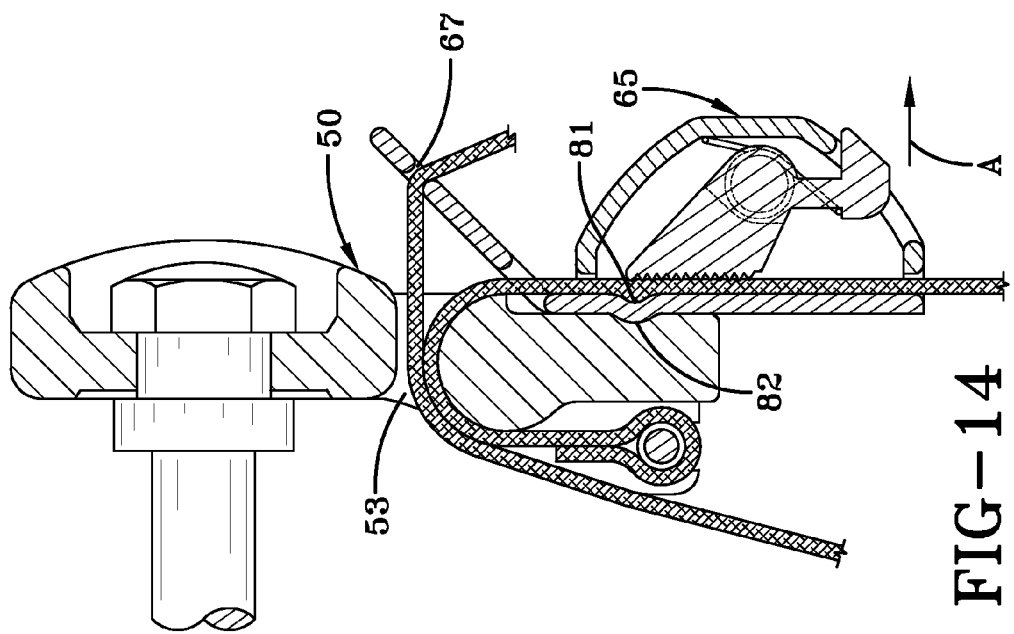

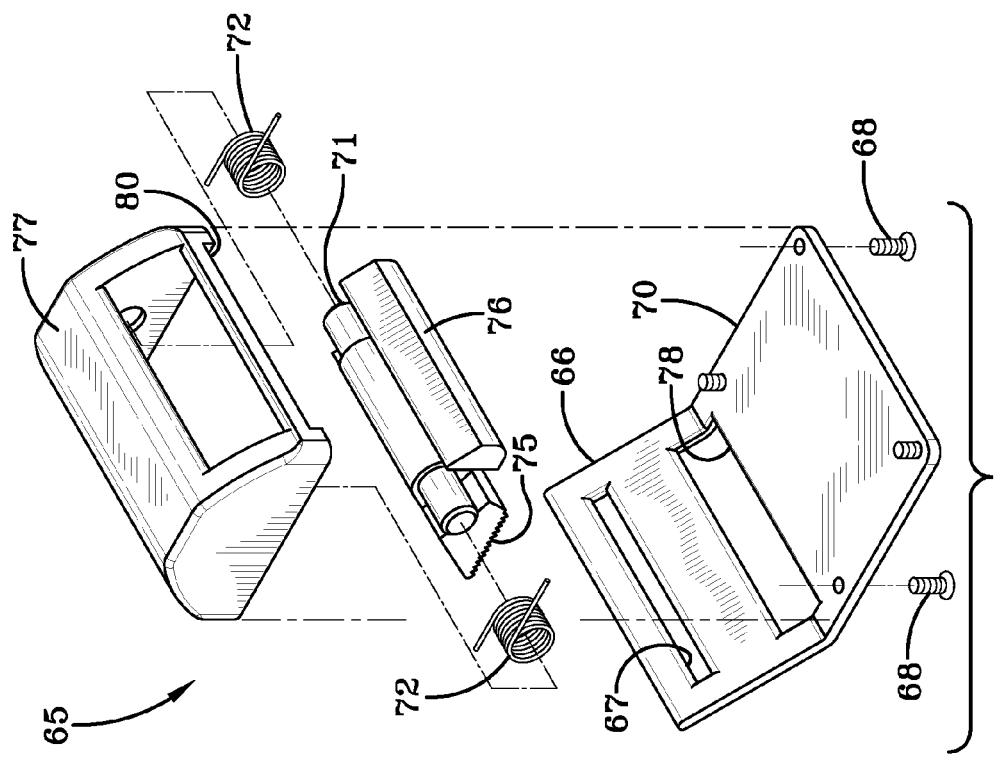
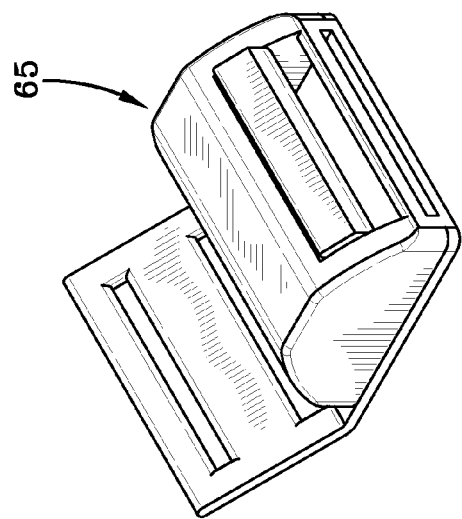

SEAT BELT SYSTEM FOR ADULTS AND CHILDREN

FIELD OF THE INVENTION

The present invention relates to a seat belt system that is suitable for restraining vehicle occupants of a wide range of heights including both children and adults, and to a vehicle seat that is provided such a seat belt system.

BACKGROUND OF THE INVENTION

A conventional seat belt system comprises a length of seat belt webbing connected at three-points to load-bearing parts of a vehicle. The webbing is arranged to have a lap portion that passes laterally across the hips of a seat occupant, and a torso portion that passes diagonally across the torso of the seat occupant from one hip to the opposite shoulder.

Typically one end of the webbing is attached to a sill anchor that is bolted to a load-bearing longitudinal structural member on one side of the vehicle seat, usually between the vehicle seat and an adjacent door. The lap and torso portions join at a buckle mechanism on the opposite side of the vehicle seat. The shoulder end of the webbing is attached to a seat belt retractor mounted to a load-bearing part of the vehicle, for example a side pillar or sill, or directly to a load-bearing seat component, optionally via a webbing guide.

The seat belt retractor increases comfort for the seat occupant restrained by the seat belt by allowing the webbing to pay out under relatively low loads to enable limited movement of the restrained seat occupant, for example to reach in-car entertainment controls or storage compartments. The seat belt retractor is biased to keep the webbing relatively taut about the seat occupant and a locking element locks the seat belt retractor against webbing payout in the event an acceleration sensor senses rapid acceleration or deceleration indicative of a vehicle crash.

The belt webbing is fastened to the buckle mechanism by a buckle tongue that is attached to the webbing such that the buckle tongue can slide along the belt webbing. The proportions of the belt webbing making up the lap and torso portions can easily be varied to suit the size of a seat occupant.

Conventional seat belt systems of this sort tend to be unsuitable for vehicle seat occupants of shorter than average stature, particularly for children, because the shoulder fastening point is fixed at or above the height of the back of the vehicle seat to accommodate an average size person. This is particularly so in seat belt systems for locations in a vehicle other than the front vehicle seats. The torso portion of the seat belt tends to be badly positioned for a child or short person and usually passes too close or adjacent to the child's neck. Because the child does not fit into the adult seat belt properly the child's shoulder can roll out of the seat belt during a crash effectively making the seat belt a two-point lap belt only. This is dangerous because the lap portion alone will then take more force in a crash and will be more likely to inflict injuries than when a torso belt section is combined. In addition there is a danger of the child sliding forward under the lap portion.

DISCUSSION OF THE PRIOR ART

It is well known that a child may feel uncomfortable with adult seat belt restraints and may position the torso portion behind their back to reduce discomfort. A solution to this problem was proposed in GB 2 015 321 A for a seat belt system product commercially marketed as "The Generation Belt". However, the seat belt system taught in GB 2 015 321 A was designed to improve the comfort of a seat belt system for a child and does not comply with the latest safety regulations of which at least one is ECE 44/03. Further, the seat belt system taught in GB 2 015 321 A provides poor comfort for adults because the seat belt webbing cannot be positioned in a direct line across the shoulder of an adult seat occupant without the seat belt webbing being redirected through a movable seat belt webbing guide.

BRIEF DESCRIPTION OF THE DRAWINGS

FIGS. 13 and 13a are schematic side elevation views of a seat belt system of the present invention provided with a load limiting device used by a child during normal conditions and during a rapid deceleration of a vehicle.

FIGS. 14-17 are side elevation views, in section, showing the fixation of the movable seat belt webbing guide to the stationary seat belt webbing guide when the seat belt system is configured for use by an adult.

FIG. 20 is a perspective view of a movable seat belt webbing guide of the present invention.

FIG. 20A is an exploded view showing the components of the movable seat belt webbing guide.

DETAILED DESCRIPTION OF THE INVENTION

Figure 1:
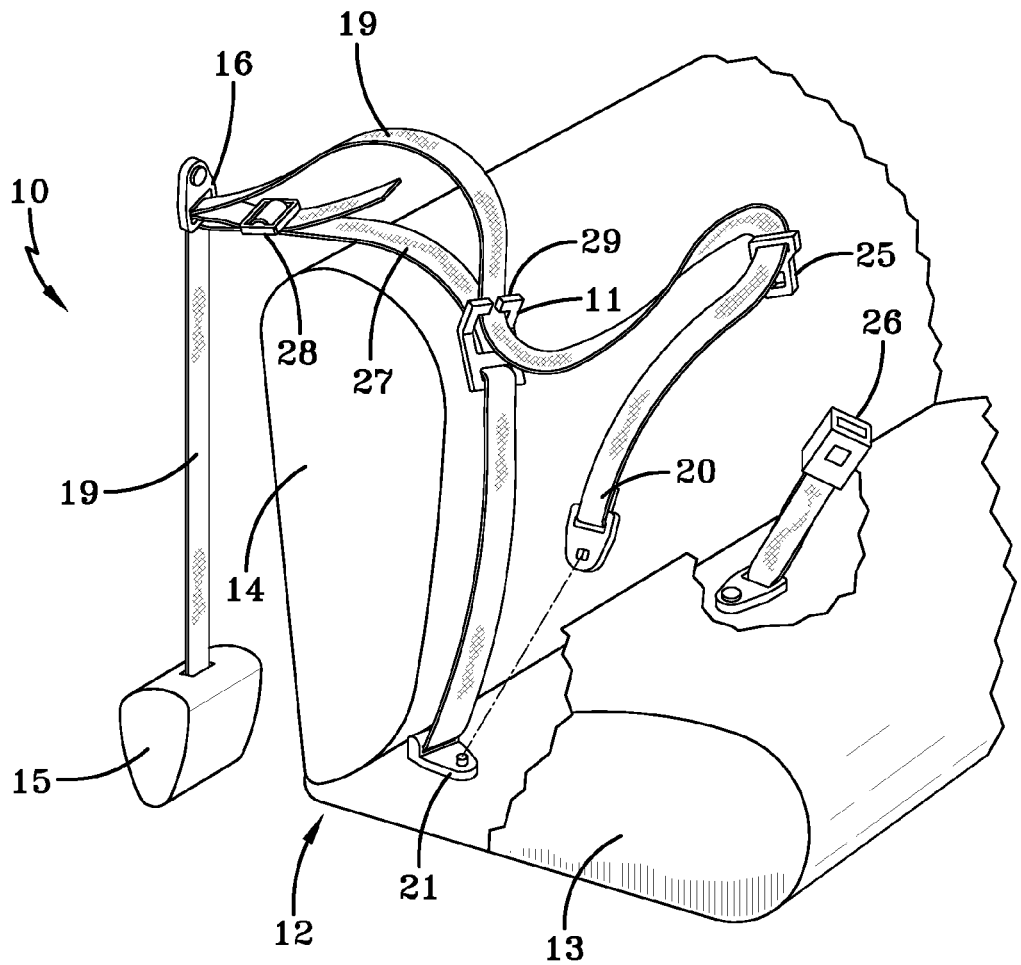
FIG. 1 is an exploded perspective view of a prior art seat belt system according to GB 2 015 321 A.
Figure 2:
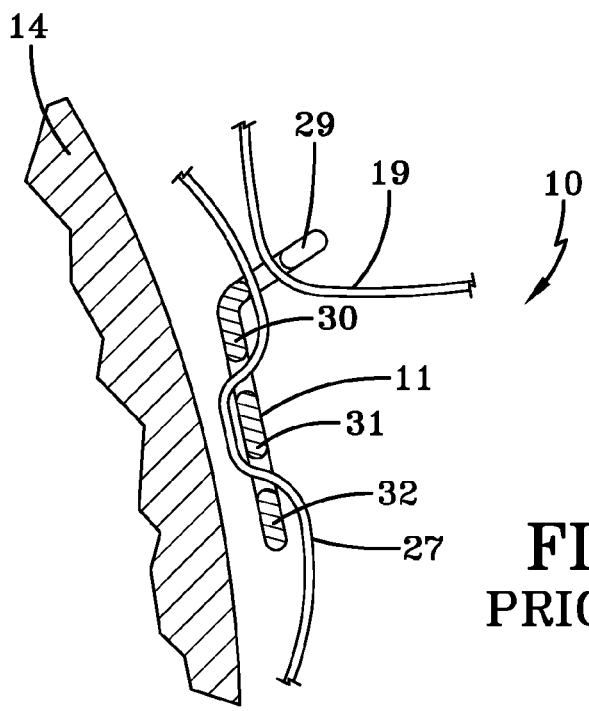
FIG. 2 is a fragmentary sectional side view on a larger scale of a connector of the prior art seat belt system of FIG. 1.
Figure 3:
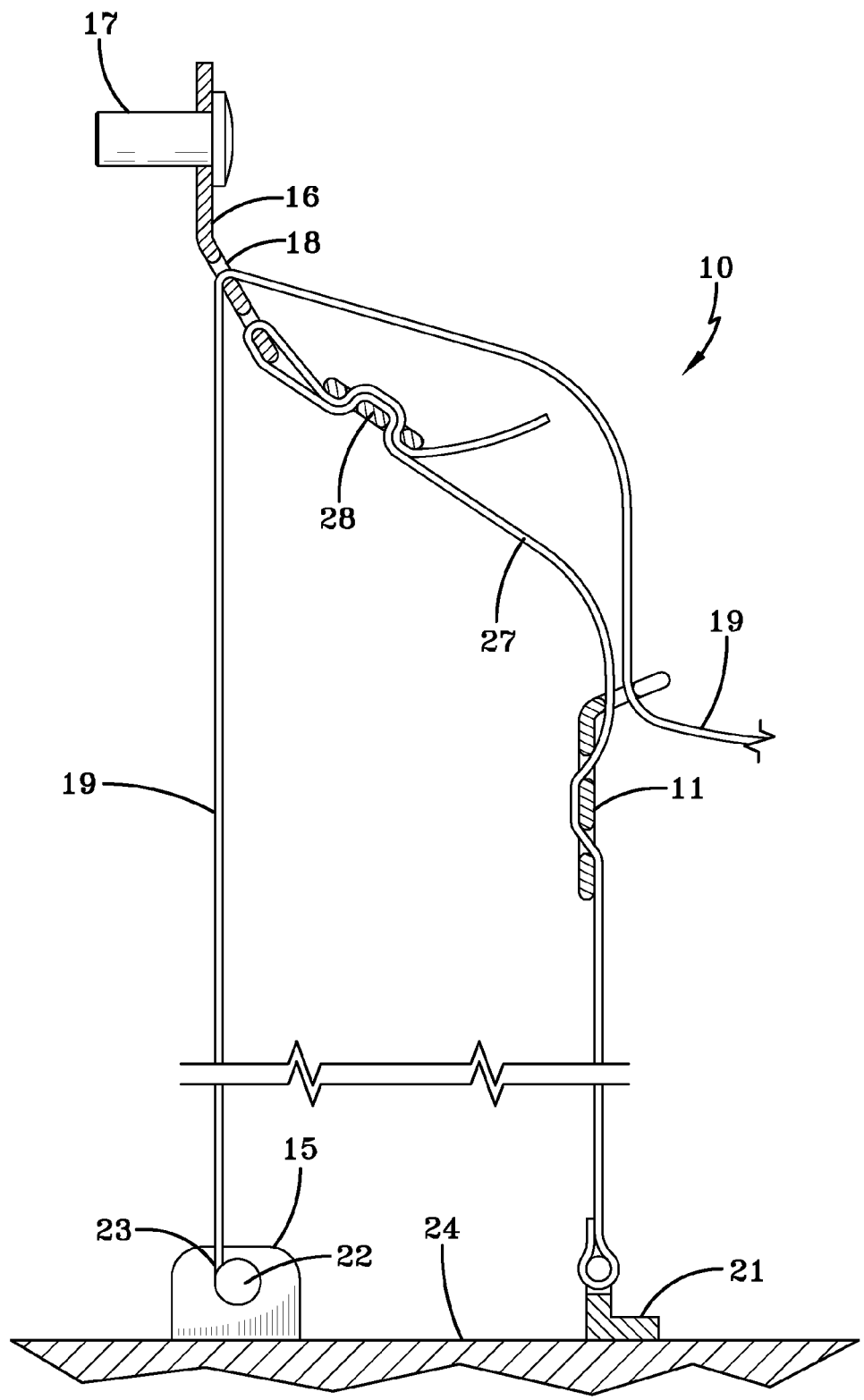
FIG. 3 is a diagrammatic side elevation view of the prior art seat belt system of FIG. 1.

A currently commercially marketed seat belt system according to GB 2 015 321 A is illustrated in FIGS. 1-3. FIG. 1 is an exploded perspective view of a seat belt system 10 having a shoulder belt height adjustment device 11, and FIG. 2 is a sectional side view of the height adjustment device. FIG. 3 is a diagrammatic side elevation view of the prior art seat belt system 10 of FIG. 1.

A vehicle seat 12 of a typical passenger vehicle, in this example a seat other than a front seat, has a seat base 13 and a backrest 14. The vehicle seat 12 is provided with a three-point seat belt system 10 having a conventional seat belt retractor 15 secured to any appropriate component of the vehicle, such as the floor 24, a side pillar, the frame of the seat or a parcel shelf located behind the seat. The seat belt retractor 15 has a rotatable spool 22 to which a first end 23 of a seat belt webbing 19 is anchored.

A stationary seat belt webbing guide 16 is secured to any appropriate component of the vehicle by an appropriate fixing means such as a bolt 17, and has a stationary seat belt webbing passageway 18 through which the seat belt webbing 19 passes and is redirected. A second end 20 of the seat belt webbing 19 is secured to any appropriate component of the vehicle, such as the floor or the frame of the vehicle seat by an anchor 21. The seat belt webbing 19 extends from the rotatable spool 22 such that the seat belt webbing can be wound onto or protracted from the rotatable spool and the length of the seat belt webbing 19 between the rotatable spool 22 and the second end 20 of the seat belt webbing can be varied. A seat belt buckle tongue 25 is attached to the seat belt webbing 19 such that the seat belt buckle tongue 25 can slide along the seat belt webbing. A seat belt buckle 26 is anchored to any appropriate component of the vehicle, such as the floor. The seat belt buckle tongue 25 can mate with the seat belt buckle 26 to provide a three-point seat belt system having a torso portion and a lap portion.

In the prior art seat belt system of FIG. 1 the upper end of the torso portion of the seat belt webbing 19 is located at the stationary seat belt webbing guide 16. This is appropriate for the shoulder heights of average sized adults, but not to the lesser shoulder heights of children. The prior art seat belt system 10 of GB 2 015 321 A provides an adjustment device comprising a strap 27 that may or may not be the same material as the seat belt webbing 19. The strap 27 is secured to appropriate components of the vehicle by anchors. An upper portion of the strap 27 is secured to the stationary seat belt webbing guide 16. A lower portion of the strap 27 is secured to the floor of the vehicle or the vehicle seat frame by the anchor 21 for the second end 20 of the seat belt webbing 19. The strap 27 extends along a surface of the backrest 14 in a generally vertical orientation and is pulled against the backrest 14 using a length adjusting means 28, which can be of any suitable type, provided with the strap in the proximity of the upper anchor for the strap. It is a potential fault of this prior art seat belt system that the strap may not be sufficiently restrained by the length adjusting means, which may prevent the strap from properly restraining a seat occupant in a crash. As will be disclosed herein the seat belt system of the present invention solves this problem.

A shoulder belt height adjustment device 11 in the form of a four bar link is threaded on the strap 27 as shown in FIG. 2 between the length adjusting means 28 and the anchor 21 at the lower portion of the strap. One bar 29 of the shoulder belt height adjustment device 11, which is split, is out of the plane of the other three bars 30, 31, 32 and is placed above the other three bars so as to be placed forwardly of the back rest 14. The strap 27 is received over the outer two 30, 32 of the co-planar bars and under the bar 31 between them. In use the shoulder belt height adjustment device 11 is moved along the strap 27, ideally to a suitable height that is just above the shoulder of a seat occupant. The diagonally oriented torso portion of the seat belt webbing 19 is then threaded beneath the split bar 29 as shown in FIGS. 1 and 2. The uppermost 30 of the co-planar bars provides a position from which the torso portion of the seat belt webbing extends. Ideally the position of the shoulder belt height adjustment device 11 would be selectively adjustable along the length of the strap 27 to suit both adult and child seat occupants.

The prior art seat belt system of GB 2 015 321 A was intended as an aftermarket product to be retrofitted to existing vehicles. The comfort for an adult was compromised because the seat belt webbing had to go through the stationary seat belt webbing guide and the shoulder belt height adjustment device that were never vertically aligned. This problem has potentially dangerous implications if this prior art seat belt system is installed in a public conveyance, such as a mini-bus that commonly transports both children and adults, because any obstacle to the use of a seat belt system can result in non-use of the seat belt system. As will be disclosed herein the seat belt system of the present invention solves this problem.

Figure 4:
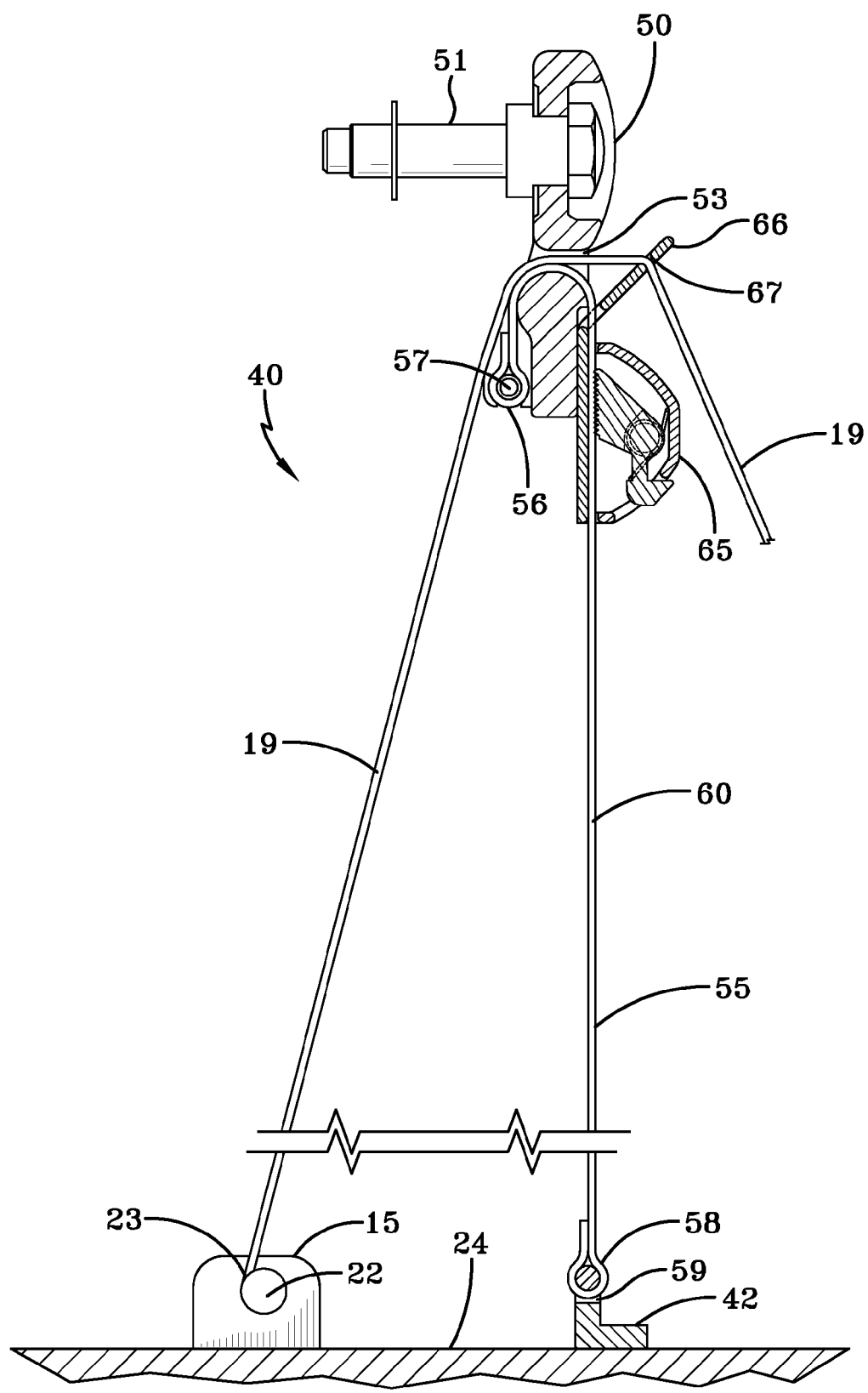
FIG. 4 is a diagrammatic side elevation view of a seat belt system according to the present invention configured for use by an adult occupying a vehicle seat.
Figure 5:
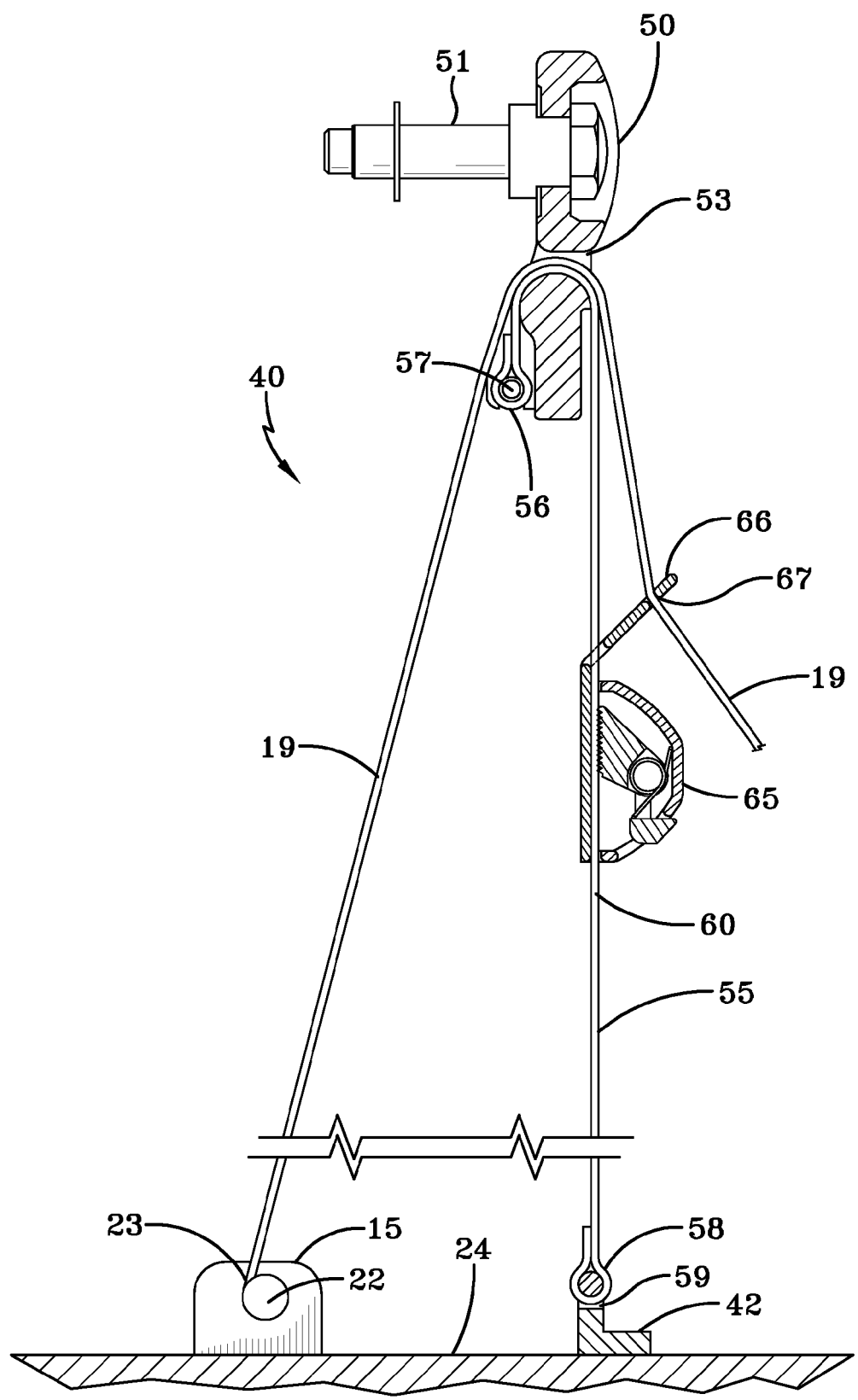
FIG. 5 is a diagrammatic side elevation view of a seat belt system according to the present invention configured for use by a child occupying a vehicle seat.
Figure 6:
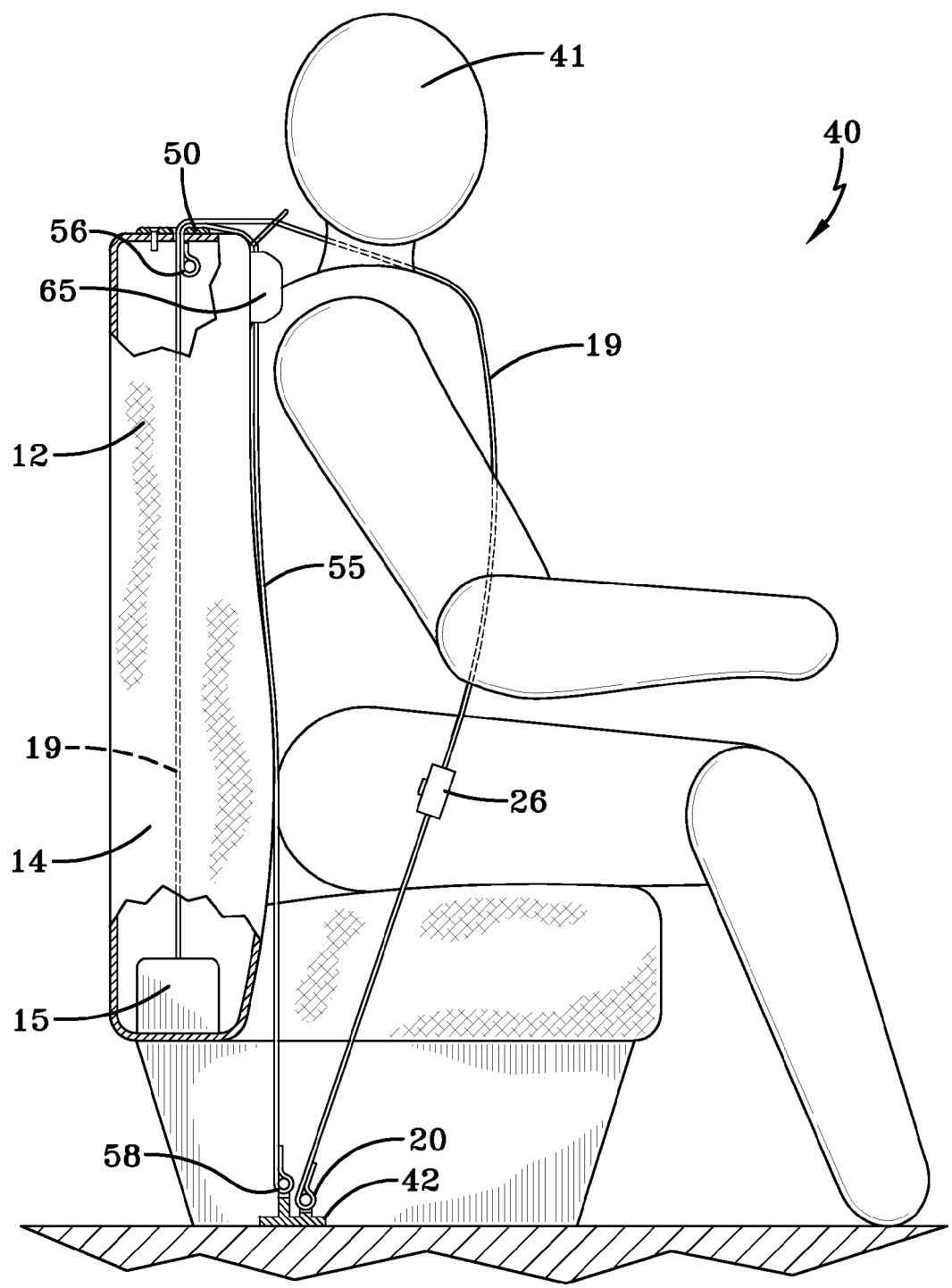
FIGS. 6 and 7 are side elevation views of seat belt systems according to the present invention restraining an adult occupying a vehicle seat.
Figure 7:
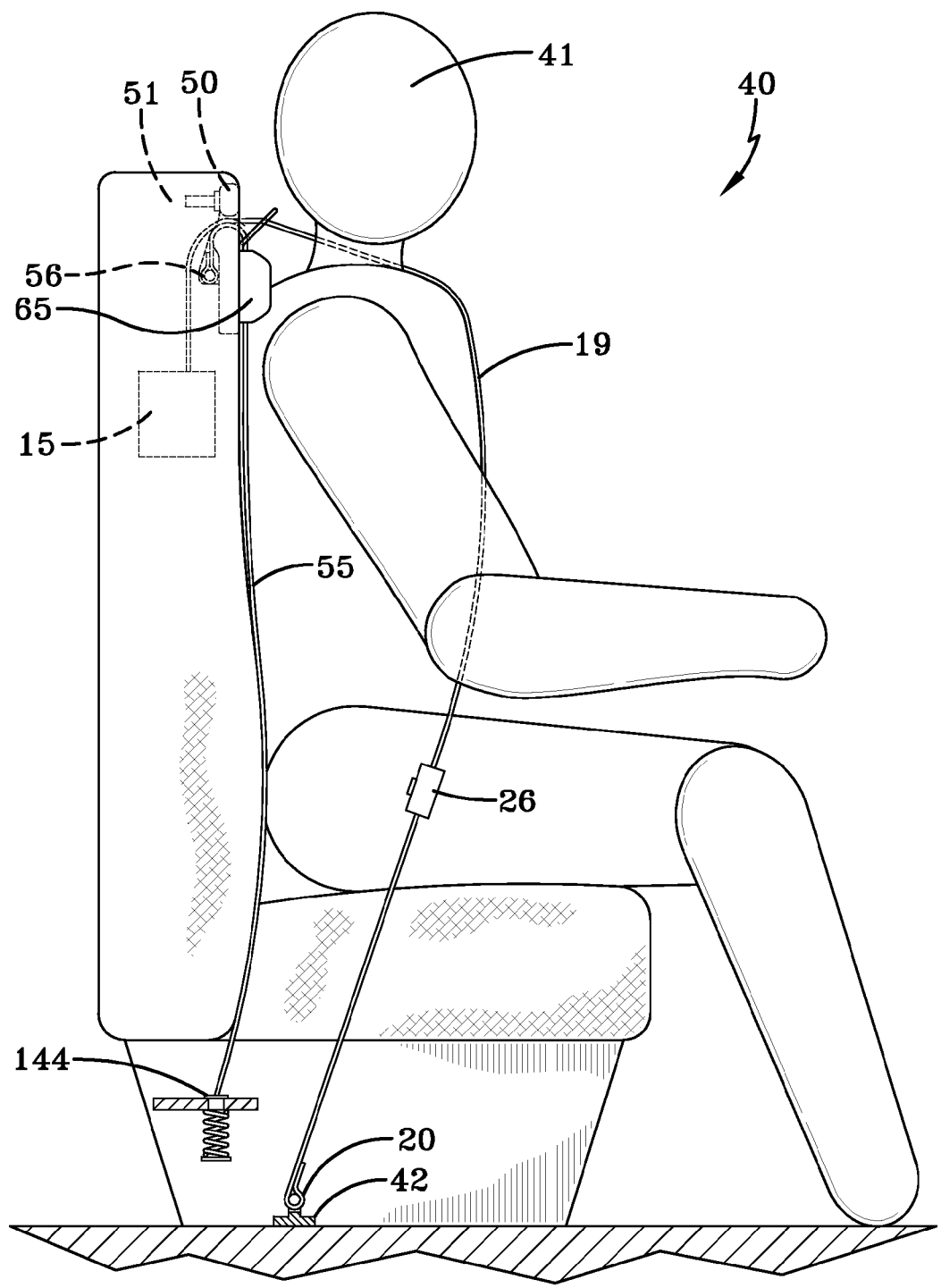
Figure 11:
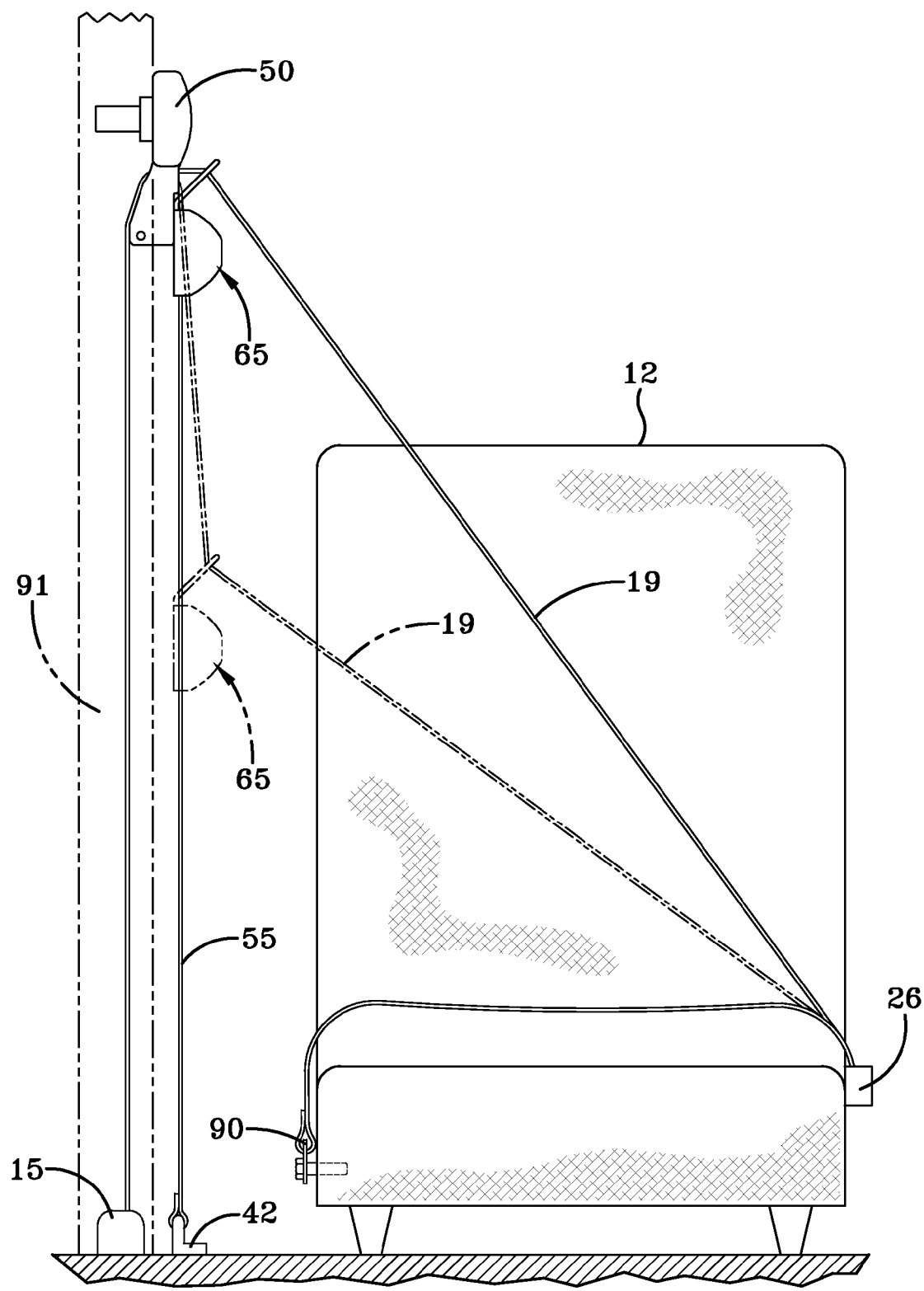
FIG. 11 is a schematic front elevation view of a seat belt system according to the present invention with some of the components mounted to a side structure of the vehicle rather than to a vehicle seat.

A seat belt system according to the present invention is shown in FIGS. 4-8. FIG. 4 is a diagrammatic side elevation view of the new seat belt system 40 configured for use by an adult occupying a vehicle seat. FIGS. 6 and 7 are side elevation views of embodiments of the new seat belt system 40 restraining an adult 41 occupying a vehicle seat 12. In all of the examples presented herein the vehicle seat 12 is a vehicle seat other than a front vehicle seat of a vehicle. FIG. 11 is a frontal view of yet another embodiment and may be referred to for understanding the arrangement of the seat belt webbing when the webbing is fixed to a buckle mechanism for a three-point seat belt system. A conventional seat belt retractor 15 is attached to a suitable component of a vehicle. In FIGS. 4 and 7 the seat belt retractor 15 is attached to the floor 24 of the vehicle and in FIGS. 6 and 7 the seat belt retractor 15 is attached to the framework of a backrest 14 of a vehicle seat 12. The seat belt retractor 15 has a rotatable spool 22 to which a first end 23 of a seat belt webbing 19 is anchored. A second end 20 of the seat belt webbing 19 is anchored to another component of the vehicle, most commonly the floor 24, by an anchor member 42. The seat belt webbing 19 extends from the rotatable spool 22 such that the seat belt webbing can be wound onto or protracted from the rotatable spool and the length of the seat belt webbing between the rotatable spool 22 and the second end 20 of the seat belt webbing 19 can be varied. A seat belt buckle tongue 25 is attached to the seat belt webbing 19 such that the seat belt buckle tongue can slide along the seat belt webbing. A seat belt buckle 26 is anchored to a component of the vehicle such that the seat belt buckle tongue 25 can mate with the seat belt buckle 26 to provide a three-point seat belt system.

Figure 18:
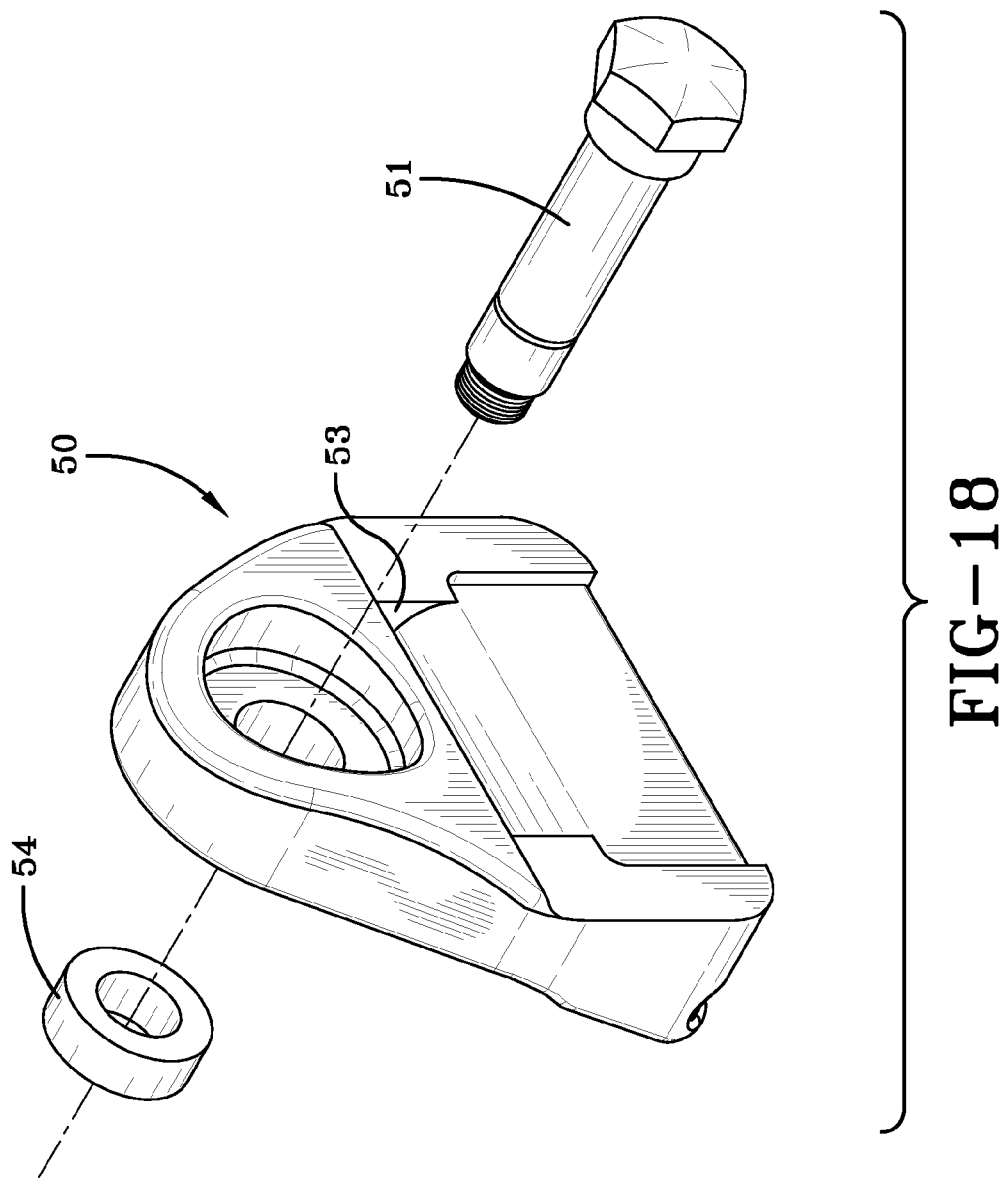
FIG. 18 is a front perspective view of a stationary seat belt webbing guide of the present invention.
Figure 19:
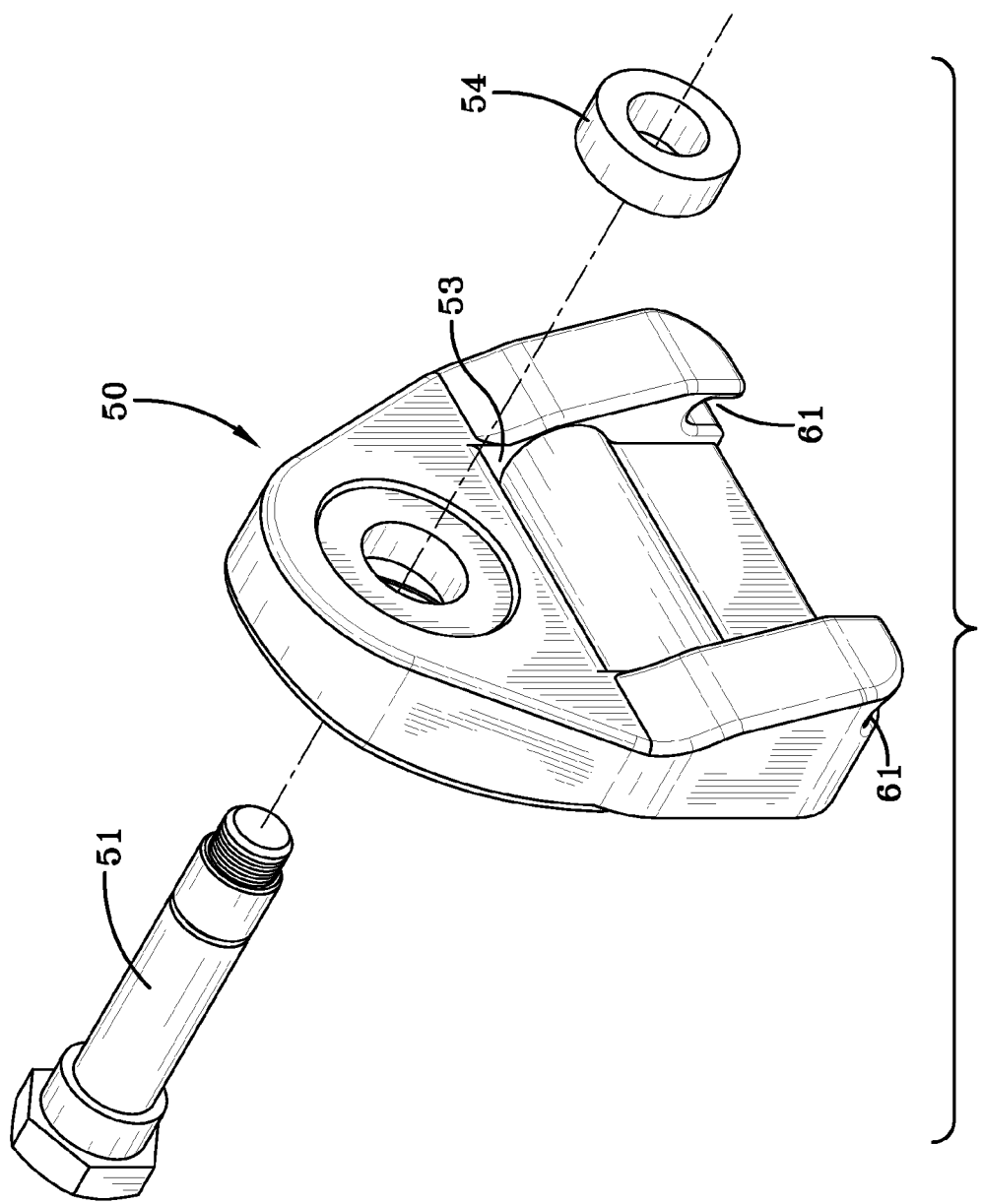
FIG. 19 is a rear perspective view of a stationary seat belt webbing guide of the present invention.

A stationary seat belt webbing guide 50 is attached to a suitable component of the vehicle. FIG. 18 is a front perspective view and FIG. 19 is a rear perspective view of an exemplary stationary seat belt webbing guide 50. In the embodiment of FIG. 7 the stationary seat belt webbing guide 50 is attached to the metal frame of the backrest 14 by a suitable means of attachment such as a bolt 51. Depending upon the particular installation a nut may be used with the bolt 51. In FIG. 6 the stationary seat belt webbing guide 50 is located in the interior of the backrest at the top of the backrest. In FIG. 7 the stationary seat belt webbing guide 50 is located on the exterior of the backrest at the top of the backrest.

The stationary seat belt webbing guide 50 has a stationary seat belt webbing passageway 53 through which the seat belt webbing 19 and a strap 55 pass. The orientation of the stationary seat belt webbing guide 50 can be adapted by an engineer to be appropriate for the location chosen for the stationary seat belt webbing guide.

Figure 8:
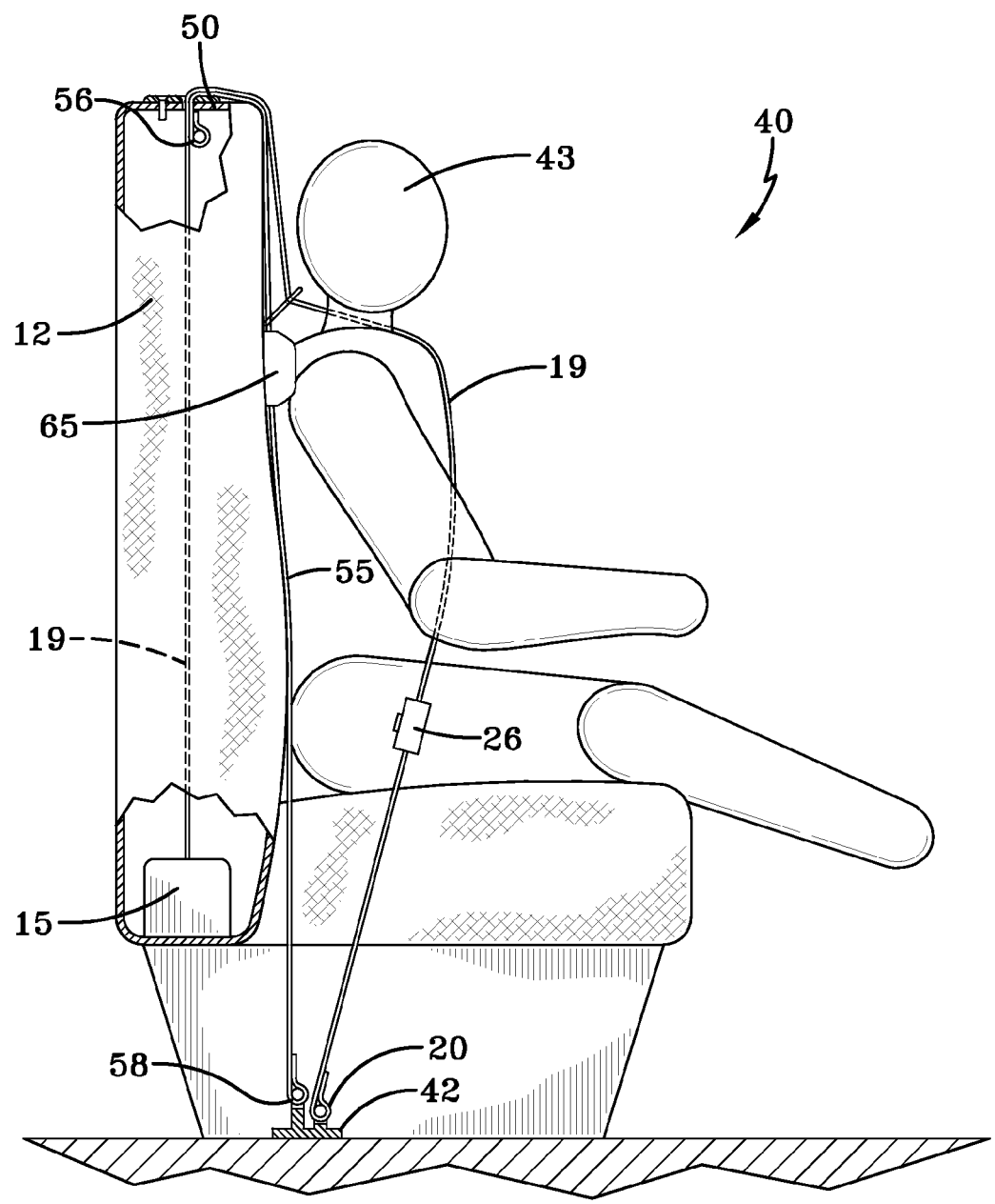
FIG. 8 is a side elevation view of a seat belt system according to the present invention restraining a child occupying a vehicle seat.

In the embodiments of FIGS. 4-8, a strap 55 extends generally vertically along a front surface of the backrest 14, that is to say the surface of the backrest against which the back of a seat occupant rests. The strap 55 is preferably the same material as the seat belt webbing 19, but this is not a requirement and the strap may comprise any suitable material. An upper end portion 56 of the strap 55 is attached to the stationary seat belt webbing guide 50 at a first anchor 57. While any suitable means may be employed for attaching the upper end portion 56 of the strap 55 to the stationary seat belt webbing guide 50, in the illustrated embodiment the first anchor 57 is a rod having its ends firmly fixed to the stationary seat belt webbing guide 50 and the upper end portion 56 of the strap 55 is folded around the rod and the folds of the strap are secured to one another by appropriate means for attachment such as stitching or an adhesive. The rod is not shown in FIG. 19, but it is understood that the ends of the rod would be fit into the slots 61. In these embodiments the first anchor 57 that attaches the upper end portion 56 of the strap 55 to the stationary seat belt webbing guide 50 is located vertically lower than the stationary seat belt webbing passageway 53 of the stationary seat belt webbing guide 50 and the strap extends from the first anchor through the seat belt webbing passageway 53. A lower end portion 58 of the strap 55 is attached to a component of the vehicle at the anchor member 42. In the illustrated embodiments the anchor member 42 has a slot 59 therein and the lower end portion 58 of the strap 55 extends through the slot. The lower end portion 58 of the strap 55 is folded around a portion of the second anchor and the folds of the strap are secured to one another by appropriate means for attachment such as stitching or an adhesive. In these embodiments the second anchor 42 is secured to the floor 24 of the vehicle and the anchor member 42 is adapted to serve as an anchor for both the lower end portion 58 of the strap 55 and the second end 20 of the seat belt webbing 19 as shown in FIGS. 6-8.

In the present invention a central portion 60 of the strap between the anchors 57, 42 is taut. The length of the central portion 60 of the strap 55 cannot be adjusted as disclosed in GB 2 015 321 A.

Figure 9:
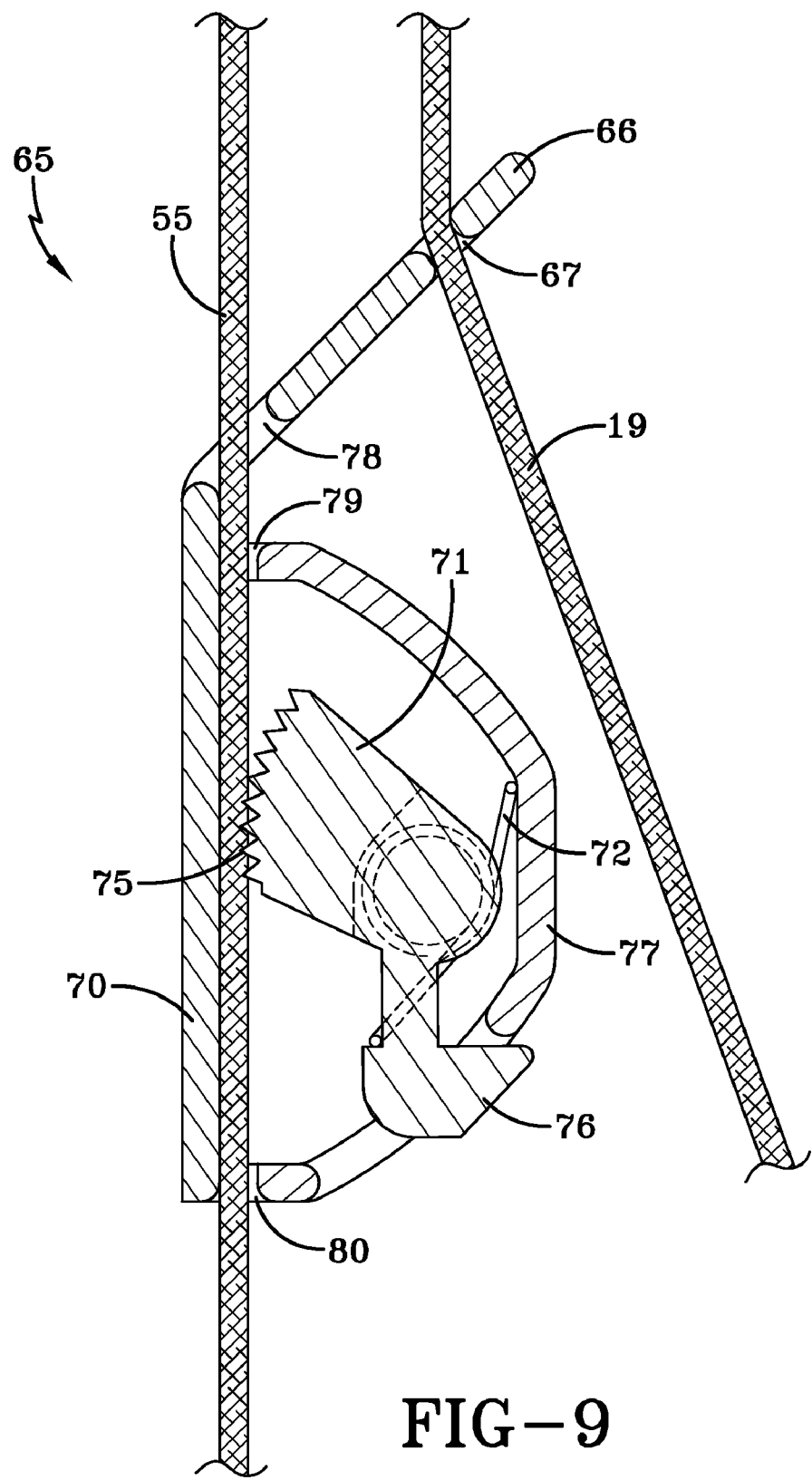
FIG. 9 is an enlarged cross-sectional view of the movable seat belt webbing guide shown in FIGS. 4 through 7 in a locked configuration.
Figure 10:
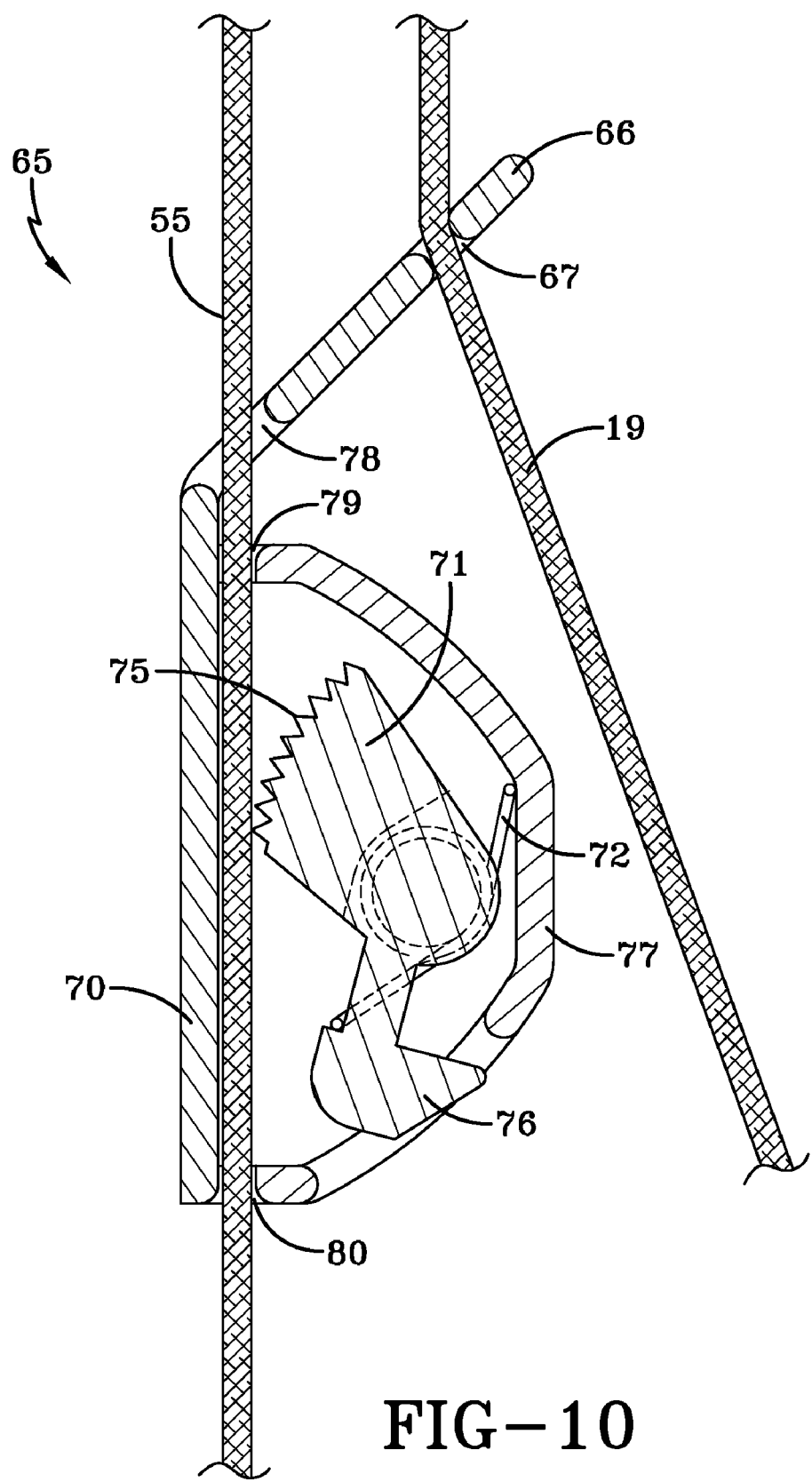
FIG. 10 is an enlarged cross-sectional view of the movable seat belt webbing guide of in a released configuration.

The working of the movable seat belt webbing guide 65 shown in FIGS. 4 through 7 is best described with reference to FIGS. 9,10 and 20A. For clarity FIG. 20 is a perspective view of a movable seat belt webbing guide 65. A guide element 66 is located at the top of the movable seat belt webbing guide 65. The guide element 66 has a seat belt webbing passageway 67 through which the seat belt webbing 19 passes. The seat belt webbing 19 extends from the rotatable spool of the seat belt retractor 15 and passes over the strap above the highest vertical extent of the strap then through the seat belt webbing passageway 67 of the guide element as shown in FIGS. 4-8, 11, 14-16 and 27-28. The guide element 66 may be either an extension of, or attached to a backing plate 70, but in the illustrated embodiment the guide element and backing plate are shown as a single piece. The angular orientation of the guide element 66 with respect to the backing plate 70 is a function of the configuration of a vehicle in which the new seat belt system is installed and the location in the vehicle where the components of the new seat belt system are installed, so that orientation is best determined by a designer in accordance with good engineering practices. As best shown in FIGS. 9 and 10 the strap 55 extends through the movable seat belt webbing guide 65 via openings 78, 79, 80 provided by the guide element 66, backing plate 70 and housing 77 and is interposed between the backing plate 70 and a movable clamping member 71 that in this exemplary embodiment can pivot about an axis. However, it should be understood that any kinematic design for moving the movable clamping member into and out of a clamping relationship with the strap and backing member may be employed in the new seat belt system. The housing 77 is secured to the backing plate 70 by any suitable means for attachment such as screws 68. FIG. 9 is an enlarged cross-sectional view of the movable seat belt webbing guide 65 in a locked configuration and FIG. 10 is an enlarged cross-sectional view of the movable seat belt webbing guide 65 in a released configuration. At least one torsion spring 72 provides the clamping force between a serrated clamping surface 75 of the movable clamping member 71 and the backing plate 70 so that the movable clamping member is biased toward the substantially vertically extending strap 55. Preferably, the serrated clamping surface 75 is curved to enhance the clamping performance. The movable clamping member 71 is pivoted toward the backing plate 70 to clamp the substantially vertically extending strap 55 and secure the movable seat belt webbing guide 65 in an appropriate location above the shoulder of a seat occupant. The clamping member 71 is movable between a first position where the strap 55 is not clamped between the clamping member 71 and the backing plate 70 and a second position where the strap is clamped between the clamping member 71 and the backing plate 70. The movable seat belt webbing guide 65 is movable along the strap 55 when the clamping member 71 is in the first position. In FIG. 10 the movable seat belt webbing guide 65 is shown from the side in a cross-section view, with force being applied to the lever 76 of the movable clamping member 71 such that the movable clamping member 71 is pivoted away from the backing plate 70 toward the housing 77 and no clamping force applied to the generally vertically extending strap 55, allowing the movable seat belt webbing guide 65 to be moved vertically along the strap 55. FIG. 9 shows the movable seat belt webbing guide 65 when no force is applied to the lever 76.

It is essential that the movable seat belt webbing guide 65 can move along the strap 55 to such an extent that the seat belt webbing passageway 67 of the movable seat belt webbing guide 65 can be vertically aligned with the stationary seat belt webbing passageway 53 of the stationary seat belt webbing guide 50 as shown in FIGS. 4 and 6 to accommodate an adult by allowing the seat belt webbing 19 to pass in a comfortable manner above the shoulder of an adult occupying the vehicle seat 12.

Preferably the movable seat belt webbing guide 65 is secured to the stationary seat belt webbing guide 50 in an easily detachable manner when the seat belt webbing passageway 67 of the movable seat belt webbing guide 65 is vertically aligned with the stationary seat belt webbing passageway 53 of the stationary seat belt webbing guide 50. FIGS. 14-17 are side elevation views, in section, showing exemplary features for the fixation of the movable seat belt webbing guide to the stationary seat belt webbing guide when the seat belt system is configured for use by an adult.

In FIG. 14 at least one protrusion 81 on the backing plate engages a complementary indentation 82 on a mating surface of the stationary seat belt webbing guide 50. A small pulling force in the direction indicated by the arrow A will free the movable seat belt webbing guide 65 from the stationary seat belt webbing guide 50.

In FIG. 15 a magnet 83 affixed to the stationary seat belt webbing guide 50 holds the backing plate 70 the movable seat belt webbing guide 65 in place when the backing plate comprises a ferromagnetic material. Of course, the magnet could be affixed to the backing plate and the stationary seat belt webbing guide 50 can comprise a ferromagnetic material. A small pulling force in the direction indicated by the arrow A will free the movable seat belt webbing guide 65 from the stationary seat belt webbing guide 50.

Figure 16:
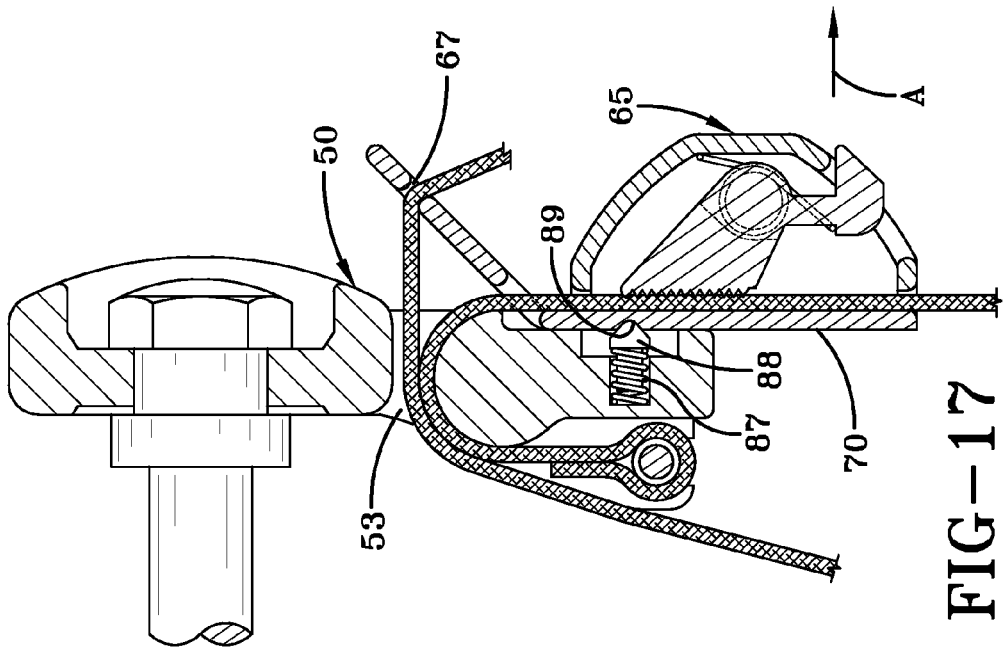

In FIG. 16 a catch 85 on the backing plate mates with a complementary ledge 86 on the stationary seat belt webbing guide 50. A small rotating and lifting force as indicated by the arrow B will free the movable seat belt webbing guide 65 from the stationary seat belt webbing guide 50.

Figure 17:
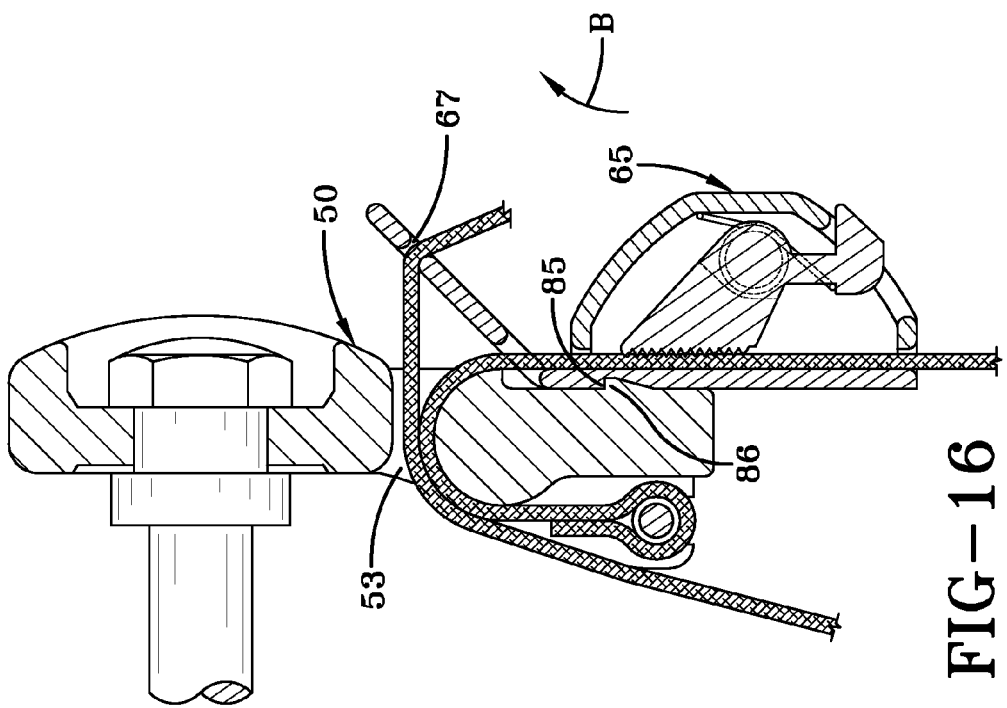

In FIG. 17 a spring 87 biases a latch 88 into a complementary indentation 89 in the backing plate 70 of the movable seat belt webbing guide 65. A small pulling force in the direction indicated by the arrow A will free the movable seat belt webbing guide 65 from the stationary seat belt webbing guide 50.

It is important that the force required for separation of the movable seat belt webbing guide 65 from the stationary seat belt webbing guide 50 in each of the foregoing examples be relatively small so that a child occupying a vehicle seat can easily move the movable seat belt webbing guide 65 from the adult configuration to a child accommodating configuration. It follows that the operation of the clamping and unclamping features of the movable seat belt webbing guide 65 should require minimal force for the same reason. Of course, these minimal force requirements will make the new seat belt system more accessible for persons that may have impaired use of their hands.

The use of a seat belt system according to the present invention for a child, or shorter adult is best explained with reference to FIGS. 5 and 8. FIG. 5 is a diagrammatic side elevation view of the new seat belt system configured for use by a child occupying a vehicle seat. FIG. 8 is a side elevation view of the new seat belt system restraining a child 43 occupying a vehicle seat 12. As shown the movable seat belt webbing guide 65 can be moved along the strap 55, as described above, such that the seat belt webbing passageway of the movable seat belt webbing guide 65 is vertically spaced from the seat belt webbing passageway 53 of the stationary seat belt webbing guide 50. The new seat belt system can restrain seat occupants of varying heights in a comfortable manner regardless of the height of a shoulder of the seat occupant by adjusting the location of the movable seat belt webbing guide 65 along the strap 55.

An important advantage of a seat belt system of the present invention is that it provides not only increased comfort for a seat occupant but also prevents the seat belt webbing from resting against the neck area of a child or small seat occupant. This is critical when the seat belt system includes a retractor pretensioner that when activated in a crash very rapidly winds up part of the seat belt webbing, which action would otherwise cause the seat belt webbing to abrade the skin of the seat occupant's neck during the pretensioning operation.

While the embodiments of the new seat belt system shown in FIGS. 4 through 8 have the stationary seat belt webbing guide 50 attached to the frame of a backrest of a vehicle seat, in an alternative embodiment shown in FIG. 11 both the stationary seat belt webbing guide 50 and the anchor member 42, to which the lower end portion 58 of the strap 55 is attached, are both attached to a structural component 91 of the vehicle located at a longitudinally extending side of the vehicle. For example, the structural component 91 of the vehicle located at a longitudinally extending side of the vehicle may be a pillar supporting the roof of the vehicle displaced laterally from the vehicle seat 12. In this exemplary embodiment the second end of the seat belt webbing 19 is anchored to a structural member of the vehicle seat 12 by a separate anchor member 90. The components of the new seat belt system in this side mounted embodiment are substantially the same as in the other embodiments and function in the same manner. The configuration for an adult is shown with solid lines while the configuration for a child is shown with dashed lines.

Figure 13:
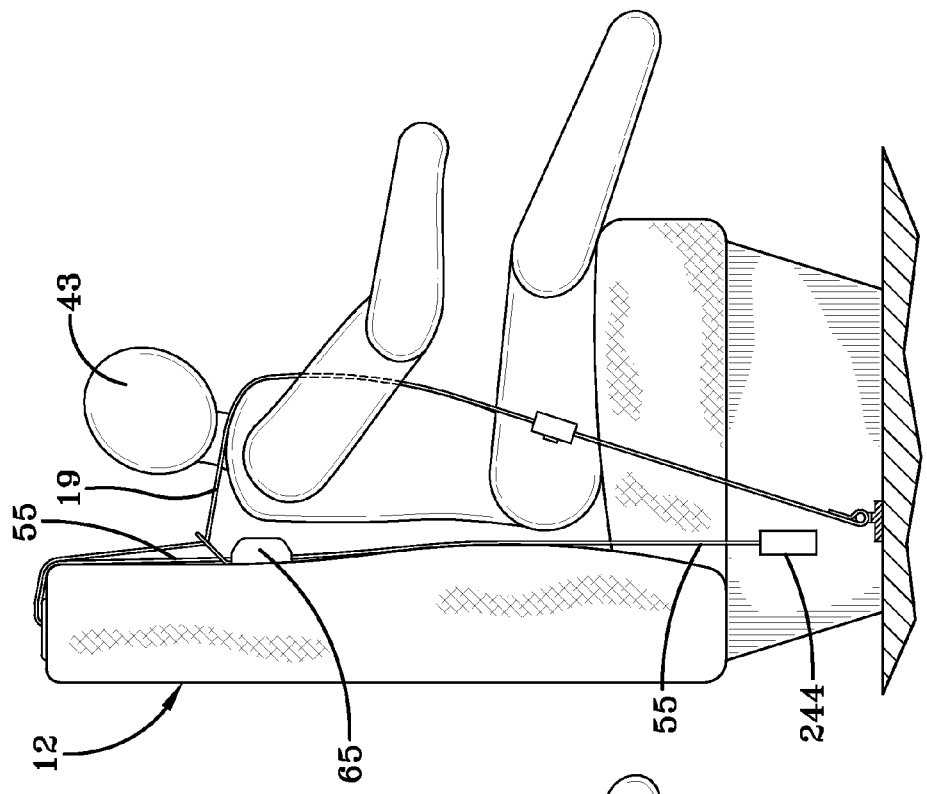
Figure 12:
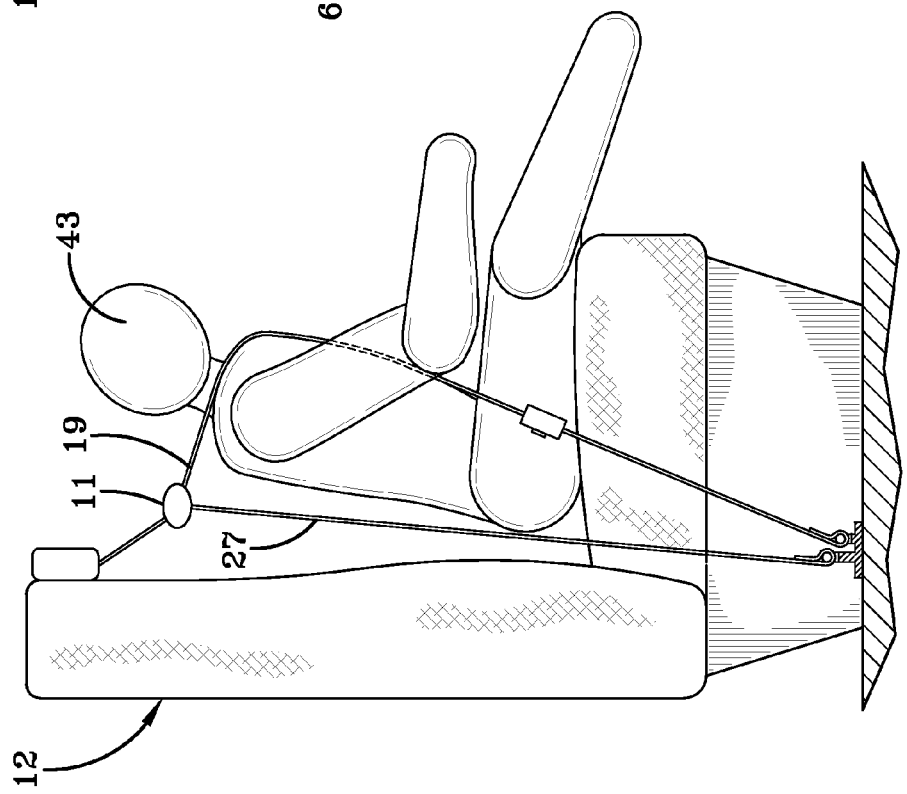
FIG. 12 is a schematic side elevation view of the prior art seat belt system of FIGS. 1-3 used by a child during a rapid deceleration of a vehicle.

The criticality of the taut condition of the central portion 60 of the strap 55 is best understood by referring briefly to FIGS. 12 and 13. FIG. 12 shows a child 43 restrained by the prior art seat belt system of GB 2 015 321 A. Because the prior art seat belt system of GB 2 015 321 A uses a four bar shoulder belt height adjustment device 11 the strap 27 has to be loose so that the shoulder belt height adjustment device can easily be moved along the strap. The loose strap 27 allows seat belt webbing 19 restraining the child 43 to move forward in the vehicle seat 12 an excessive distance to possibly impact a structure of the interior of the vehicle with a possibility that the child's shoulder may roll out of the seat belt. These same phenomena may occur with an adult seat occupant.

In the present invention as shown FIGS. 13 and 13a, the strap 55 of the new seat belt system is taut and anchored in a non-adjustable manner so the forward movement of the child 43 in the vehicle seat 12, or adult seat occupant, is more restricted by the seat belt webbing 19 to prevent the seat occupant from possibly impacting a structure of the interior of the vehicle. In FIGS. 13 and 13a the lower end of the strap 55 is secured to a load limiting device 144 such as a coil spring. FIG. 13 shows the beginning of forward movement by the child and FIG. 13a shows the child moved forward even further when load limiting has been provided by the load limiting device.

In the preferred embodiment of FIG. 7 the stationary seat belt webbing guide 50 is fixed to the structure of the seat back below the top of the seat back and at the front of the seat back, and the seat belt retractor 15 is fastened to the structure of the seat back slightly below the stationary seat belt webbing guide 50 by a bolt 51. The strap 55 extends from an upper end portion 56 to a lower end that is fixed to a load limiting device 144, here a coil spring, which reduces the load placed on a seat occupant by the seat belt webbing during a crash when the rotatable spool of the seat belt retractor 15 has been locked against rotation.

In the embodiments of FIGS. 7, 13 and 13a a load limiting means 144 yields a small specified amount to reduce the load placed on the child by the seat belt webbing during a crash when the rotatable spool of the seat belt retractor has been locked against rotation. The load limiting means 144 being a coiled spring gives the advantage of tensioning the strap 55 as well as providing load limiting for the child. Another advantage of the coiled spring as a load limiting means is that while compression of the spring provides load limiting, the subsequent expansion of the spring after the compression returns the spring back to its resting configuration.

Figure 28:
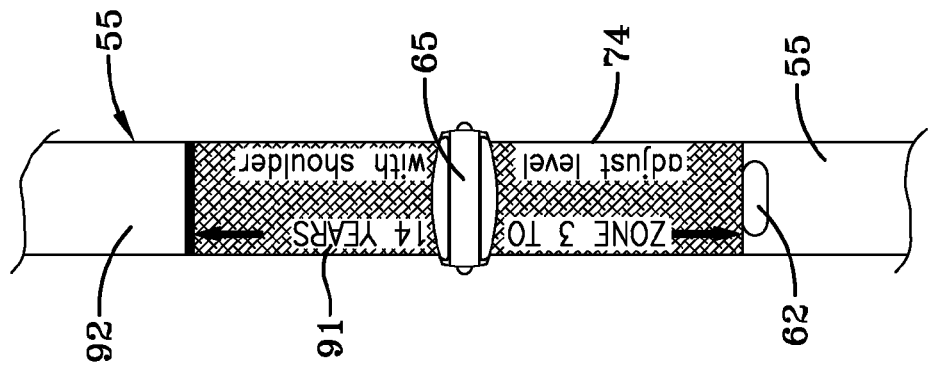
FIG. 28 is a diagrammatic representation of a portion of a strap with markings indicating proper use of the seat belt system for a child.

A seat belt system of any embodiment of the present invention may be provided with a load limiting feature that reduces the load placed on a seat occupant by the seat belt webbing during a crash when the seat belt retractor spool has been locked against rotation. A way of providing the seat belt system with a load limiting capability for only a child is to have at least a part of the strap 55 comprised of a load levelling extendable material. In FIG. 28 the generally vertically extending strap 55 comprises two sections 91, 92. The lower section 91 is formed of extendable material such as will extend elastically or alternatively plastically under a predetermined force. The upper section 92 is non-extendable, for example conventional seat belt webbing material. Extendable webbing for safety restraint seat belts usable for the lower extendable portion 91 is disclosed using yarns taught for example in U.S. Pat. No. 4,710,423 A1, U.S. Pat. No. 5,830,811 A1, U.S. Pat. No. 5,830,811 A1, U.S. Pat. No. 6,057,252 A1 and U.S. Pat. No. 6,991,850 B2. Such elongatable webbing can be woven, knitted or sewn to conventional non-extendable webbing to make a generally vertically extending strap according to the invention. U.S. Pat. No. 4,710,423 A1, U.S. Pat. No. 5,830,811 A1, U.S. Pat. No. 5,830,811 A1, U.S. Pat. No. 6,057,252 A1 and U.S. Pat. No. 6,991,850 B2 are each incorporated herein in the entirety for the purpose of teaching extendable yarns and extendable webbing for safety restraint seat belts that may be used in the practice of the present invention.

Load limiting of the seat belt system may alternatively be provided using a seat belt retractor equipped with a torsion bar as taught for example in U.S. Pat. No. 5,899,402 A1 and U.S. Pat. No. 6,065,706 A1; or a seat belt retractor that is driven by an electric motor as taught for example in U.S. Pat. No. 6,705,558 B2; or the seat belt retractor is equipped with a hydraulic load damping feature as taught for example in U.S. Pat. No. 6,695,243 B2; or the seat belt retractor is equipped with wires that dissipate energy as taught for example in U.S. Pat. No. 6,969,022 B1; each of the foregoing publications being incorporated herein in the entirety for the purpose of teaching load limiting seat belt retractors that may be used in the practice of the present invention.

Some persons may find the permanent installation of the strap to be unfashionable or undesirable for any reason, the strap may be made a variable feature of the seat belt system as illustrated in FIGS. 21 to 27. This issue can be addressed by a seat belt system wherein the first anchor to which the upper end portion of the strap 55 is attached is a strap retractor mechanism 63 and the lower end portion of the strap 55 is attached to a fastening member 34, 44 that is detachably fixed to a second anchor 37, 48 which is attached to a structural member 73 of the vehicle seat 12 or a structural member 84 of the vehicle and the strap is be retracted towards the strap retractor mechanism 63 when the fastening member 34, 44 is detached from the second anchor 37, 48.

The strap retractor mechanism preferably should have automatic locking and emergency locking features known from seat belt retractors as disclosed for example in U.S. Pat. No. 4,597,546 A1 or U.S. Pat. No. 4,817,885 A1. U.S. Pat. No. 4,597,546 A1 and U.S. Pat. No. 4,817,885 A1 are both incorporated herein in their entirety for the purpose of teaching seat belt retractors having automatic locking and emergency locking features that may be employed in the practice of the present invention. The strap retractor mechanism 63 is installed at a location below the stationary seat belt webbing guide 50. The strap 55 is wound upon a rotatable spool of the strap retractor mechanism 63. A strap passageway in the stationary seat belt webbing guide 50 directs the strap in a substantially vertical orientation. A fastening member 34, 44 is attached to an end of the strap. When the strap is protracted from the spool of the strap retractor mechanism 63 it is pulled downward to allow the fastening member 34, 44 to mate with a second anchor 37, 48 in a removable manner.

Figure 21:
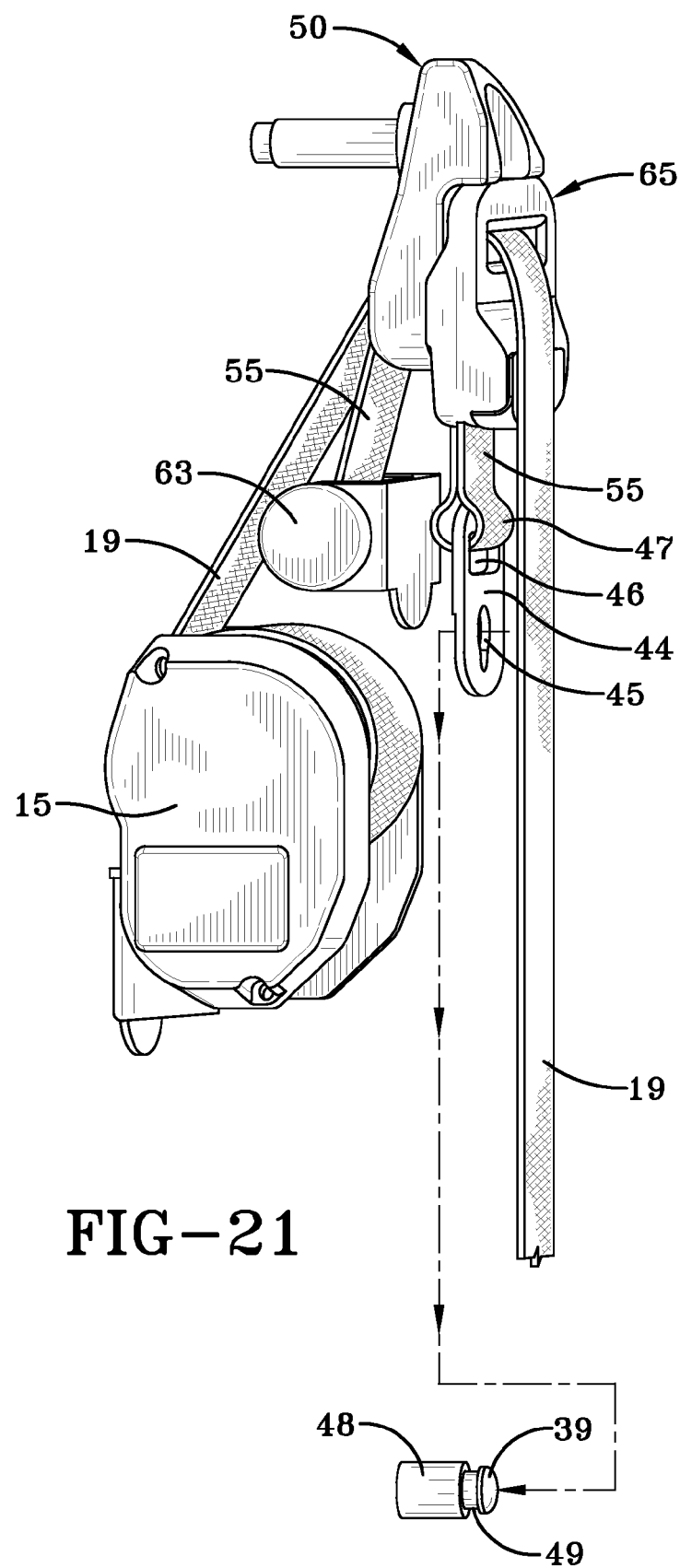
FIG. 21 is a perspective view of the components of another embodiment of the present invention wherein the strap is not permanently attached to a structural member of the seat.

In the embodiment of FIGS. 21-24 and 26 the fastening member at the end of the strap 55 is a strap anchor plate 44 having a keyhole shaped opening therein 45. The keyhole shaped opening 45 is an opening having a portion that is a slot in communication with a portion that is wider than the slot. The second anchor is a rivet type anchor peg 48 with an annular groove 49 and enlarged head 49 is fixed to either a structural member 75 of the seat or a structural member of the vehicle, such as the floor. It is understood that a load limiter of the type illustrated at 144 in FIG. 7 could be disposed between the anchor peg 48 and the strap 55 to provide a load limiting feature, or that the strap 55 may comprise at least in part elongatable webbing of the type disclosed in the foregoing text to provide load limiting. A closed loop 47 in the strap 55 extends through a strap receiving slot 46 in the strap anchor plate 44 to attach the strap 55 to the strap anchor plate 44. When a person of sufficient height, usually an adult, is occupying a vehicle seat fitted with this embodiment of the invention the strap 55 may be retracted by the strap retractor mechanism 63 as shown in FIG. 21 if the seat occupant so desires for reasons of personal preference. The lower end 30 of the seat belt webbing fixed to an anchor member 42 that is in turn fixed to the floor 84 of the vehicle. A seat belt buckle tongue 25 can slide along the seat belt webbing to an appropriate location. The movable seat belt webbing guide 65 is adjacent to and fixed to the stationary seat belt webbing guide 50 as described above and the seat belt webbing 19 can be protracted from the seat belt retractor 15 to provide a three point seat belt as described above.

Figure 22:
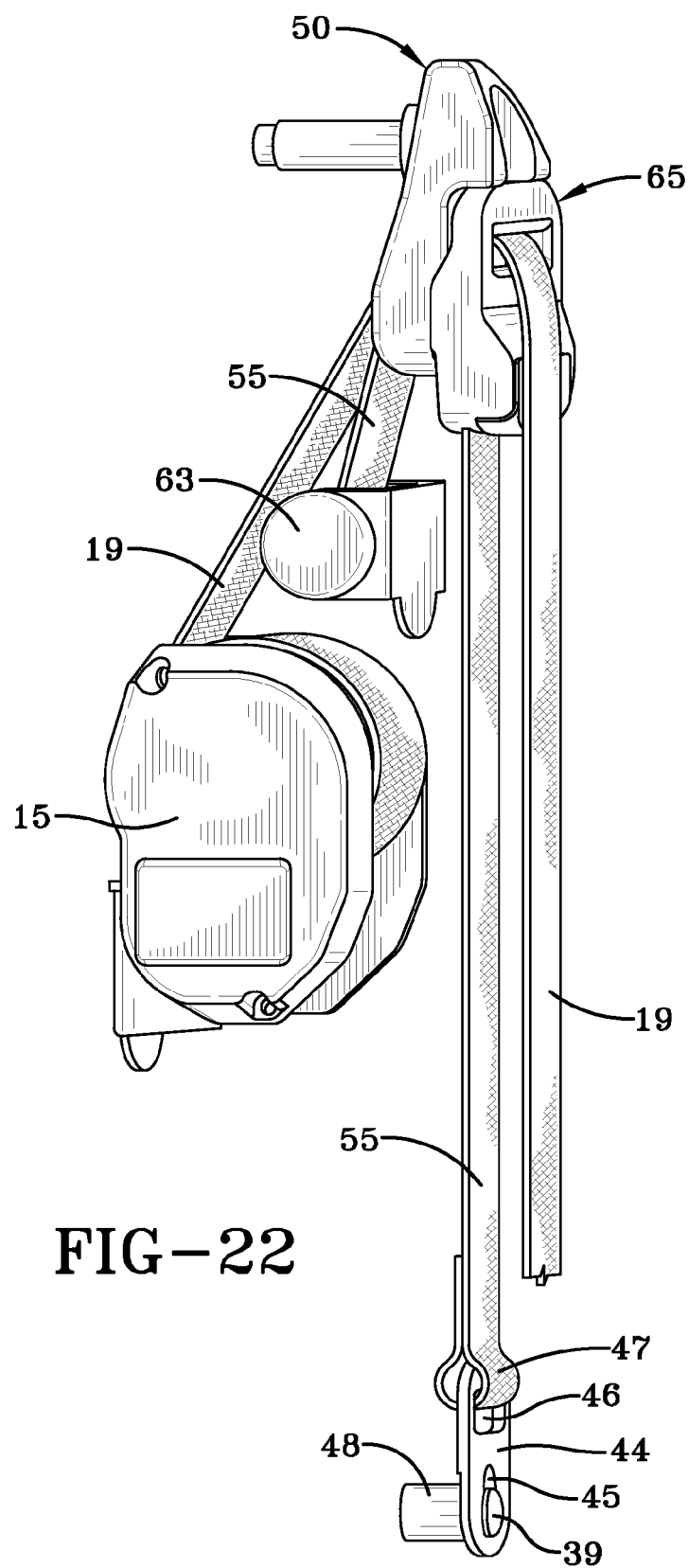
FIG. 22 shows the embodiment of FIG. 21 with the strap attached to a structural member of the vehicle seat in a detachable manner.
Figure 23:
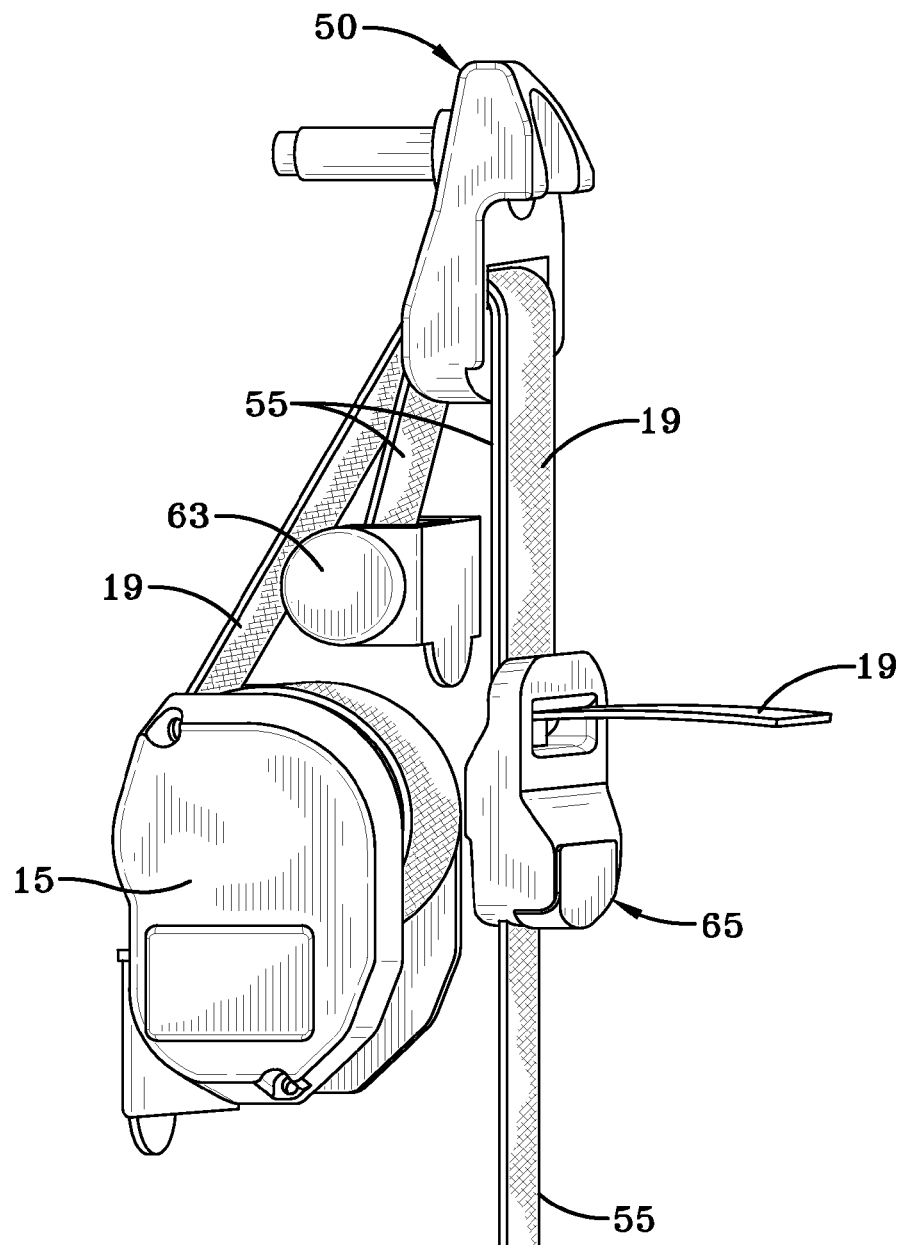
FIG. 23 shows the embodiment of FIGS. 21 and 22 wherein the movable belt webbing guide is spaced from the stationary seat belt webbing guide.
Figure 24:
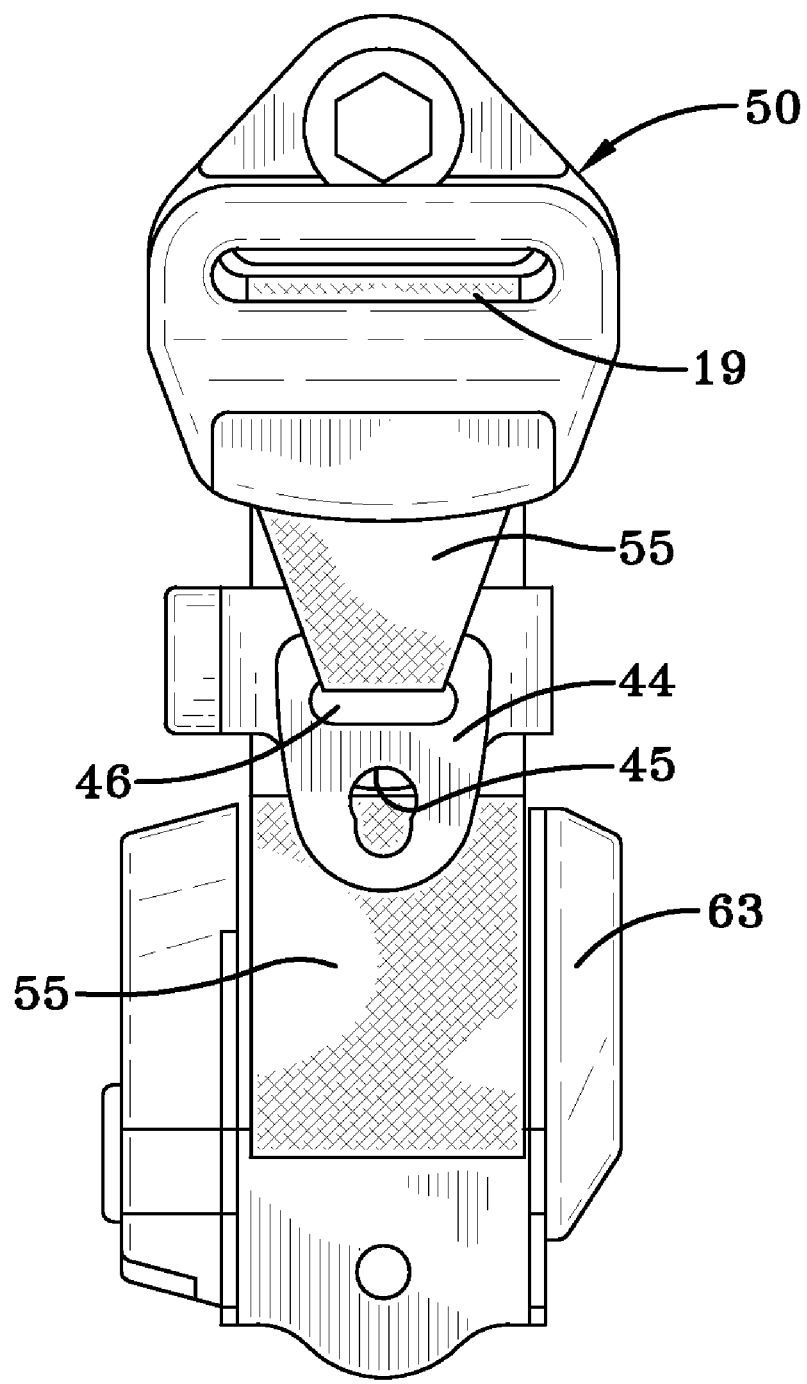
FIG. 24 is a frontal the embodiment of FIGS. 21 and 22 wherein the stationary seat belt webbing guide is mounted to a component of the vehicle other than the vehicle seat such as a pillar supporting the roof of the vehicle with the strap retracted and the seat belt webbing and movable seat belt webbing guide not shown for clarity.
Figure 26:
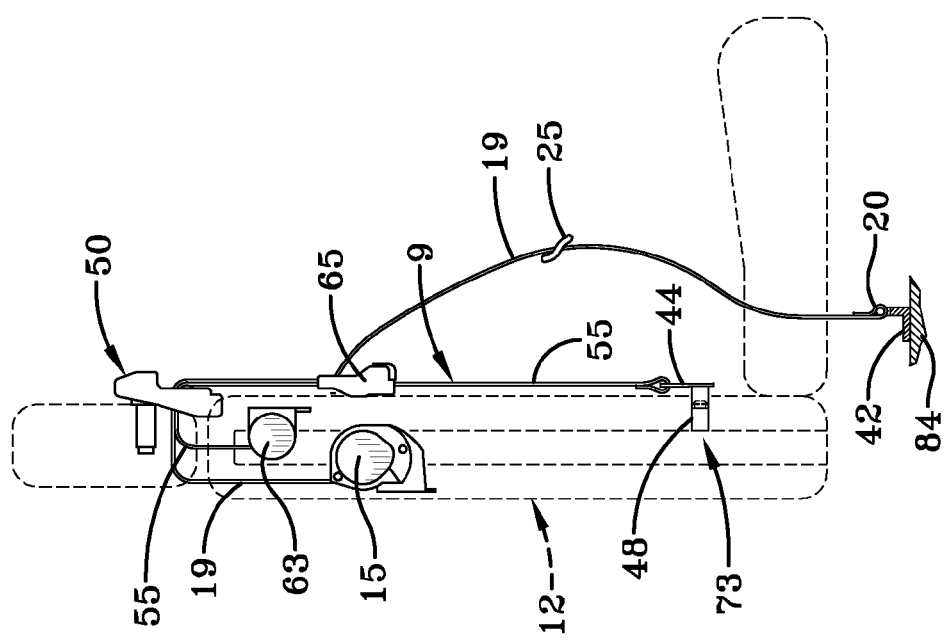
FIG. 26 is a diagrammatic side view of the seatbelt system of FIGS. 21-23.

When a shorter person, usually a child, is occupying a vehicle seat fitted with this embodiment of the invention the strap 55 may be protracted from the strap retractor mechanism 63 as shown in FIG. 22. The wide portion of the keyhole shaped opening 45 in the strap anchor plate 44 is slipped over the head 39 of the anchor peg 48 and aligned with the annular groove 49 in the anchor peg which is secured to the seat belt frame 75 in any appropriate manner such as welding or a threaded fastener mechanism. When the protracting force on the strap is reduced the strap retractor mechanism 63 retracts a portion of the strap to remove slack and the narrow portion of the keyhole shaped slot 45 the strap anchor plate 44 mates with the annular groove 49 of the anchor peg 48 to secure the strap in a substantially vertical orientation. As shown in FIGS. 23 and 26 the seat belt webbing guide 65 can then be slid along the strap 55 to direct the seat belt webbing 19 in the manner described above regarding other embodiments.

Figure 25:
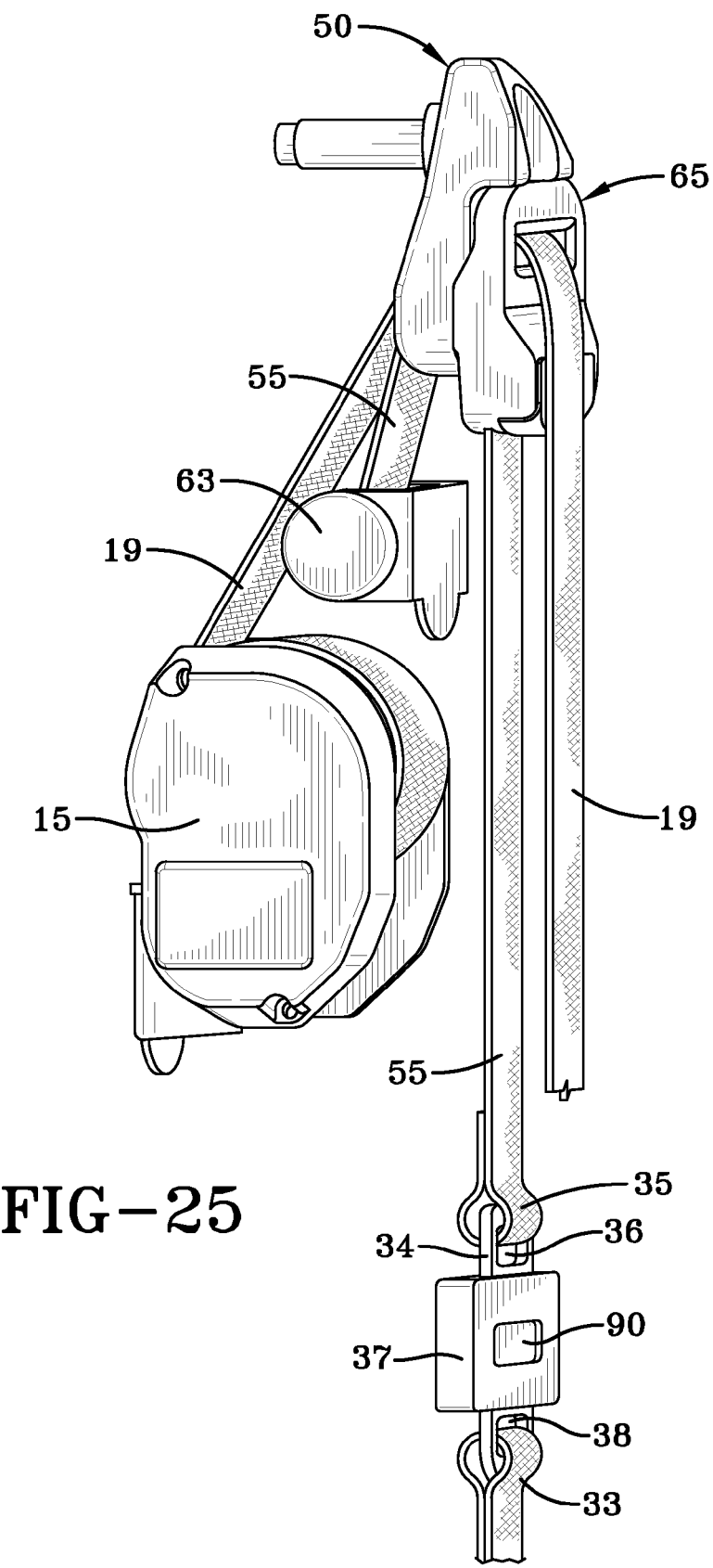
FIG. 25 shows the embodiment of FIG. 23 with the strap attached to a structural member of the vehicle seat in a detachable manner.
Figure 27:
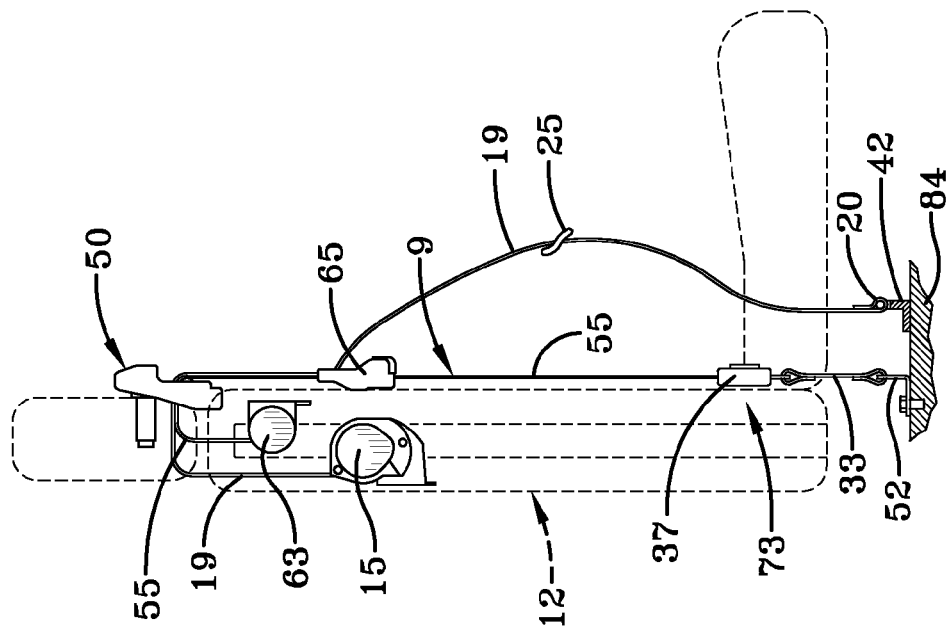
FIG. 27 is a diagrammatic side view of the seatbelt system of FIG. 25.

Alternatively, as shown in FIGS. 25 and 27, the fastening member at the end of the strap is a buckle tongue 34 that may be inserted into a buckle 37 for the strap and secured in the buckle. The buckle tongue 34 may be released from the buckle 37 using a release mechanism activated by a button 90. A closed loop 35 in the strap 55 extends through a strap receiving slot 36 in the buckle tongue 34 to attach the strap 55 to the buckle tongue. A buckle anchor strap 35 has a loop 38 that extends through a slot 38 in a portion of the buckle 37. The buckle anchor strap 35 is shown fixed to a strap anchor member 52 that is in turn fixed to the floor 84 of the vehicle.

With the exception of the substitution of the tongue and buckle as an anchoring system for the strap, this embodiment functions like the embodiment of FIGS. 21-24 and 26.

A tongue receiving passage of the strap buckle 37 should be of a size that will not mate with the buckle tongue 25 of the seat belt in a locking manner, and the buckle tongue 34 fixed to the strap 55 should be of a size that it cannot be accommodated by the buckle of the seat belt in a locking manner.

The movable seat belt webbing guide interacts with the strap in the same manner described with respect to FIGS. 4 10 and 12-20A. If the occupant of a seat equipped with the new seat belt system is large enough that the movable seat belt webbing guide can be secured to the stationary seat belt webbing guide as described above with respect to FIGS. 14-17, the strap can be unfastened from the anchoring member and allowed to be wound up on the retractor with only a short length of the strap extending through the strap passageway in the stationary seat belt webbing guide as shown in FIG. 21. The seat belt system can then function as a well known three point seat belt system as described above with respect to FIGS. 4, 6 and 7. However, if the seat occupant is smaller the strap can easily be withdrawn from the spool of the retractor and the fastening member fixed to the anchoring member in a removable manner. The movable seat belt webbing guide can then be moved along the strap as described with respect to FIGS. 4-10 and 12-20A.

A seat belt system of any embodiment of the present invention may be provided with a pretensioning device that reduces slack from the seat belt webbing when a significant deceleration of the vehicle is detected by an acceleration sensor. Pretensioning can be provided by a retractor pretensioner which is a seat belt retractor provided with a pretensioning mechanism as taught for example in U.S. Pat. No. 6,042,041 A1 and U.S. Pat. No. 5,967,440 A1. Alternatively, the seat belt system could be provided with a buckle pretensioner that reduces slack from the seat belt webbing by pulling on the seat belt buckle, as taught for example in U.S. Pat. No. 6,460,935 B1. U.S. Pat. No. 6,042,041 A1 and U.S. Pat. No. 5,967,440 A1 are both incorporated herein in the entirety for the purpose of teaching seat belt retractors provided with a pretensioning mechanism that may be used in the practice of the present invention. U.S. Pat. No. 6,460,935 B1 is incorporated herein in the entirety for the purpose of teaching a seat belt system provided with a buckle pretensioner that reduces slack from the seat belt webbing by pulling on the seat belt buckle that may be used in the practice of the present invention.

FIG. 28 shows a portion 74 of a strap 55 with provided with markings 74, such as colours or symbols or words, or a combination thereof, that indicate the location on the strap to which the movable seat belt webbing guide 65 may be attached when the seat belt system is restraining a child, especially a child that is not seated upon a booster cushion. A stop 62 is formed on the strap 55 to serve as an indicator of the lower limit of the intended range of locations for the movable seat belt webbing guide 65.

The components of the new seat belt system can be made of any suitable materials, such as metals or plastics, selected in accordance with good engineering practices.

While the preferred embodiments of the present invention have been shown and described, it will be obvious in the art that changes and modifications may be made without departing from the teachings of the invention. The matter set forth in the foregoing description and accompanying drawings is offered by way of illustration only and not as a limitation. The actual scope of the invention is intended to be defined in the following claims.

The invention claimed is:

1. A seat belt system comprising:
(a) a seat belt retractor attached to a component of a vehicle, the seat belt retractor having a rotatable spool to which a first end of a seat belt webbing is anchored, a second end of the seat belt webbing being anchored to a component of the vehicle, the seat belt webbing extending from the rotatable spool such that the seat belt webbing can be wound onto or protracted from the rotatable spool and the length of the seat belt webbing between the rotatable spool and the second end of the seat belt webbing can be varied;
(b) a stationary seat belt webbing guide attached to a component of the vehicle and having a stationary seat belt webbing passageway through which the seat belt webbing passes;
(c) a strap that extends substantially vertically; and
(d) a movable seat belt webbing guide that is movable along the strap, an upper end portion of the strap being attached to the stationary seat belt webbing guide at a first anchor and a lower end portion of the strap attached to a component of the vehicle at a second anchor such that a central portion of the strap is taut and the length of the central portion of the strap cannot be adjusted; and the movable seat belt webbing guide having a backing plate a movable clamping member, and a guide element at the top of the movable seat belt webbing guide, the guide element having a seat belt webbing passageway through which the seat belt webbing passes, the seat belt webbing extending from the rotatable spool and passing over the strap above the highest vertical extent of the strap then through the seat belt webbing passageway of the guide element, the strap extending through the movable seat belt webbing guide and interposed between the backing plate and the movable clamping member, the movable seat belt webbing guide being movable along the strap, the movable clamping member being movable between a first position where the strap is not clamped between the movable clamping member and the backing plate and a second position where the strap is clamped between the movable clamping member and the backing plate, the movable seat belt webbing guide being movable along the strap when the movable clamping member is in the first position to such an extent that the seat belt webbing passageway of the movable seat belt webbing guide can be vertically aligned with the stationary seat belt webbing passageway of the stationary seat belt webbing guide and the seat belt webbing passageway of the movable seat belt webbing guide can be vertically spaced from the seat belt webbing passageway of the stationary seat belt webbing guide.

2. The seat belt system of claim 1 wherein the movable seat belt webbing guide is secured to the stationary seat belt webbing guide in a detachable manner when the seat belt webbing passageway of the movable seat belt webbing guide is vertically aligned with the stationary seat belt webbing passageway of the stationary seat belt webbing guide.

3. The seat belt system of claim 1 wherein the first anchor that attaches the upper end portion of the strap to the stationary seat belt webbing guide is located vertically lower than the seat belt webbing passageway of the stationary seat belt webbing guide.

4. The seat belt system of claim 1 wherein both the stationary seat belt webbing guide and the second anchor, to which the lower end portion of the strap is attached, are both attached to a pillar located at a longitudinally extending side of the vehicle.

5. The seat belt system of claim 1 wherein the stationary seat belt webbing guide is attached to a backrest of a vehicle seat and the central portion of the strap extends along a surface of the backrest.

6. The seat belt system of claim 1 wherein the second anchor, to which the lower end portion of the strap is attached, is attached to a floor of the vehicle.

7. A seat belt system according to claim 5 wherein the second anchor, to which the lower end portion of the strap is attached, is attached to a structural member of the seat.

8. The seat belt system of claim 1 wherein the seat belt system further comprises a seat belt buckle tongue attached to the seat belt webbing such that the seat belt buckle tongue can slide along the seat belt webbing, and a seat belt buckle that is anchored to a component of the vehicle such that the seat belt buckle tongue can mate with the seat belt buckle to provide a three-point seat belt system for restraining a seat occupant in a comfortable manner regardless of the height of a shoulder of the seat occupant by adjusting the location of the movable seat belt webbing guide along the strap.

9. The seat belt system of claim 1 wherein the strap is provided with visible markings that indicates the location on the strap to which the movable seat belt webbing guide may be attached when the seat belt system is restraining a child.

10. The seat belt system of claim 1 wherein the seat belt system includes a means for reducing slack from the seat belt webbing when a significant deceleration of a vehicle is detected by an acceleration sensor.

11. The seat belt system of claim 1 wherein the seat belt system includes a means for reducing the load placed on a seat occupant by the seat belt webbing during a crash when the rotatable spool has been locked against rotation.

12. A seat belt system comprising:
(a) a seat belt retractor attached to a component of a vehicle, the seat belt retractor having a rotatable spool to which a first end of a seat belt webbing is anchored, a second end of the seat belt webbing being anchored to a component of the vehicle, the seat belt webbing extending from the rotatable spool such that the seat belt webbing can be wound onto or protracted from the rotatable spool and the length of the seat belt webbing between the rotatable spool and the second end of the seat belt webbing can be varied;
(b) a stationary seat belt webbing guide attached to a component of the vehicle and having a stationary seat belt webbing passageway through which the seat belt webbing passes;
(c) a strap that extends substantially vertically, an upper end portion of the strap being attached to the stationary seat belt webbing guide at a first anchor and a lower end portion of the strap attached to a component of the vehicle at a second anchor such that a central portion of the strap is taut and the length of the central portion of the strap cannot be adjusted; and
(d) a movable seat belt webbing guide that is movable along the strap, the movable seat belt webbing guide having a backing plate a movable clamping member, and a guide element at the top of the movable seat belt webbing guide, the guide element having a seat belt webbing passageway through which the seat belt webbing passes, the seat belt webbing extending from the rotatable spool and passing over the strap above the highest vertical extent of the strap then through the seat belt webbing passageway of the guide element, the strap extending through the movable seat belt webbing guide and interposed between the backing plate and the movable clamping member, the movable seat belt webbing guide being movable along the strap, the movable clamping member being movable between a first position where the strap is not clamped between the movable clamping member and the backing plate and a second position where the strap is clamped between the movable clamping member and the backing plate, the movable seat belt webbing guide being movable along the strap when the movable clamping member is in the first position to such an extent that the seat belt webbing passageway of the movable seat belt webbing guide can be vertically aligned with the stationary seat belt webbing passageway of the stationary seat belt webbing guide and the seat belt webbing passageway of the movable seat belt webbing guide can be vertically spaced from the seat belt webbing passageway of the stationary seat belt webbing guide, wherein the movable seat belt webbing guide is secured to the stationary seat belt webbing guide in a detachable manner when the seat belt webbing passageway of the movable seat belt webbing guide is vertically aligned with the stationary seat belt webbing passageway of the stationary seat belt webbing guide.

13. The seat belt system of claim 12 wherein the first anchor that attaches the upper end portion of the strap to the stationary seat belt webbing guide is located vertically lower than the seat belt webbing passageway of the stationary seat belt webbing guide.

14. The seat belt system of claim 12 wherein both the stationary seat belt webbing guide and the second anchor are both attached to a pillar located at a longitudinally extending side of the vehicle.

15. The seat belt system of claim 12 wherein the stationary seat belt webbing guide is attached to a backrest of a vehicle seat and the central portion of the strap extends along a surface of the backrest.

16. The seat belt system of claim 15 wherein the second anchor is attached to a floor of the vehicle.

17. The seat belt system of claim 15 wherein the second anchor is attached to a structural member of the vehicle seat.

18. The seat belt system of claim 15 wherein the first anchor to which the upper end portion of the strap is attached is a strap retractor mechanism and the lower end portion of the strap is attached to a fastening member that is fixed to the second anchor in a removable manner, the second anchor being attached to a structural member of the vehicle seat or a structural member of the vehicle, and the strap is retracted towards the strap retractor mechanism when the fastening member is detached from the second anchor.

19. The seat belt system of claim 12 wherein the strap is provided with visible markings that indicates the location on the strap to which the movable seat belt webbing guide may be attached when the seat belt system is restraining a child.

20. The seat belt system of claim 12 wherein the seat belt system further comprises a seat belt buckle tongue attached to the seat belt webbing such that the seat belt buckle tongue can slide along the seat belt webbing, and a seat belt buckle that is anchored to a component of the vehicle such that the seat belt buckle tongue can mate with the seat belt buckle to provide a three-point seat belt system for restraining a seat occupant.

21. The seat belt system of claim 12 wherein the seat belt system includes a means for reducing slack from the seat belt webbing when a significant deceleration of a vehicle is detected by an acceleration sensor.

22. The seat belt system of claim 12 wherein the seat belt system includes a means for reducing the load placed on a seat occupant by the seat belt webbing during a crash when the rotatable spool has been locked against rotation.

23. A seat belt system comprising:
(a) a seat belt retractor attached to a component of a vehicle, the seat belt retractor having a rotatable spool to which a first end of a seat belt webbing is anchored, a second end of the seat belt webbing being anchored to a component of the vehicle, the seat belt webbing extending from the rotatable spool such that the seat belt webbing can be wound onto or protracted from the rotatable spool and the length of the seat belt webbing between the rotatable spool and the second end of the seat belt webbing can be varied;
(b) a seat belt buckle tongue attached to the seat belt webbing such that the seat belt buckle tongue can slide along the seat belt webbing, and a seat belt buckle that is anchored to a component of the vehicle such that the seat belt buckle tongue can mate with the seat belt buckle to provide a three-point seat belt system for restraining a seat occupant
(c) a stationary seat belt webbing guide attached to a backrest of a vehicle seat and having a stationary seat belt webbing passageway through which the seat belt webbing passes;
(d) a strap that extends substantially vertically, an upper end portion of the strap being attached to the stationary seat belt webbing guide at a first anchor, the first anchor being located vertically lower than the seat belt webbing passageway of the stationary seat belt webbing guide, and a lower end portion of the strap attached to a component of the vehicle at a second anchor such that a central portion of the strap is taut and the length of the central portion of the strap cannot be adjusted, the central portion of the strap extending along a surface of the backrest of the vehicle seat; and
(e) a movable seat belt webbing guide that is movable along the strap, the movable seat belt webbing guide having a backing plate a movable clamping member, and a guide element at the top of the movable seat belt webbing guide, the guide element having a seat belt webbing passageway through which the seat belt webbing passes, the seat belt webbing extending from the rotatable spool and passing over the strap above the highest vertical extent of the strap then through the seat belt webbing passageway of the guide element, the strap extending through the movable seat belt webbing guide and interposed between the backing plate and the movable clamping member, the movable seat belt webbing guide being movable along the strap, the movable clamping member being movable between a first position where the strap is not clamped between the movable clamping member and the backing plate and a second position where the strap is clamped between the movable clamping member and the backing plate, the movable seat belt webbing guide being movable along the strap when the movable clamping member is in the first position to such an extent that the seat belt webbing passageway of the movable seat belt webbing guide can be vertically aligned with the stationary seat belt webbing passageway of the stationary seat belt webbing guide and the seat belt webbing passageway of the movable seat belt webbing guide can be vertically spaced from the seat belt webbing passageway of the stationary seat belt webbing guide, wherein the movable seat belt webbing guide is secured to the stationary seat belt webbing guide in a detachable manner when the seat belt webbing passageway of the movable seat belt webbing guide is vertically aligned with the stationary seat belt webbing passageway of the stationary seat belt webbing guide.

24. The seat belt system of claim 23 wherein the second anchor is attached to a floor of the vehicle.

25. The seat belt system of claim 23 wherein the second anchor is attached to a structural member of the vehicle seat.

26. The seat belt system of claim 23 wherein the first anchor to which the upper end portion of the strap is attached is a strap retractor mechanism and the lower end portion of the strap is attached to a fastening member that is fixed to the second anchor in a removable manner, the second anchor being attached to a structural member of the vehicle seat or a structural member of the vehicle, and the strap is retracted towards the strap retractor mechanism when the fastening member is detached from the second anchor.

27. The seat belt system of claim 23 wherein the strap is provided with visible markings that indicates the location on the strap to which the movable seat belt webbing guide may be attached when the seat belt system is restraining a child.

28. The seat belt system of claim 23 wherein the seat belt system includes a means for reducing slack from the seat belt webbing when a significant deceleration of a vehicle is detected by an acceleration sensor.

29. The seat belt system of claim 23 wherein the seat belt system includes a means for reducing the load placed on a seat occupant by the seat belt webbing during a crash when the rotatable spool has been locked against rotation.

30. A vehicle seat assembled with a seat belt system, the seat belt system comprising:
(a) a seat belt retractor attached to a component of a vehicle, the seat belt retractor having a rotatable spool to which a first end of a seat belt webbing is anchored, a second end of the seat belt webbing being anchored to a component of the vehicle, the seat belt webbing extending from the rotatable spool such that the seat belt webbing can be wound onto or protracted from the rotatable spool and the length of the seat belt webbing between the rotatable spool and the second end of the seat belt webbing can be varied;
(b) a seat belt buckle tongue attached to the seat belt webbing such that the seat belt buckle tongue can slide along the seat belt webbing, and a seat belt buckle that is anchored to a component of the vehicle such that the seat belt buckle tongue can mate with the seat belt buckle to provide a three-point seat belt system for restraining a seat occupant
(c) a stationary seat belt webbing guide attached to a backrest of the vehicle seat and having a stationary seat belt webbing passageway through which the seat belt webbing passes;
(d) a strap that extends substantially vertically, an upper end portion of the strap being attached to the stationary seat belt webbing guide at a first anchor, the first anchor being located vertically lower than the seat belt webbing passageway of the stationary seat belt webbing guide, and a lower end portion of the strap attached to a component of the vehicle at a second anchor such that a central portion of the strap is taut and the length of the central portion of the strap cannot be adjusted, the central portion of the strap extending along a surface of the backrest of the vehicle seat; and
(e) a movable seat belt webbing guide that is movable along the strap, the movable seat belt webbing guide having a backing plate a movable clamping member, and a guide element at the top of the movable seat belt webbing guide, the guide element having a seat belt webbing passageway through which the seat belt webbing passes, the seat belt webbing extending from the rotatable spool and passing over the strap above the highest vertical extent of the strap then through the seat belt webbing passageway of the guide element, the strap extending through the movable seat belt webbing guide and interposed between the backing plate and the movable clamping member, the movable seat belt webbing guide being movable along the strap, the movable clamping member being movable between a first position where the strap is not clamped between the movable clamping member and the backing plate and a second position where the strap is clamped between the movable clamping member and the backing plate, the movable seat belt webbing guide being movable along the strap when the movable clamping member is in the first position to such an extent that the seat belt webbing passageway of the movable seat belt webbing guide can be vertically aligned with the stationary seat belt webbing passageway of the stationary seat belt webbing guide and the seat belt webbing passageway of the movable seat belt webbing guide can be vertically spaced from the seat belt webbing passageway of the stationary seat belt webbing guide, wherein the movable seat belt webbing guide is secured to the stationary seat belt webbing guide in a detachable manner when the seat belt webbing passageway of the movable seat belt webbing guide is vertically aligned with the stationary seat belt webbing passageway of the stationary seat belt webbing guide.

31. The vehicle seat assembled with a seat belt system of claim 30 wherein the first anchor to which the upper end portion of the strap is attached is a strap retractor mechanism attached to a structural member of the seat and the lower end portion of the strap is attached to a fastening member that is fixed to the second anchor in a removable manner, the second anchor being attached to a structural member of the vehicle seat, and the strap is retracted towards the strap retractor mechanism when the fastening member is detached from the second anchor.

32. The vehicle seat assembled with a seat belt system of claim 30 wherein the strap is provided with visible markings that indicates the location on the strap to which the movable seat belt webbing guide may be attached when the seat belt system is restraining a child.

33. The vehicle seat assembled with a seat belt system of claim 30 wherein the seat belt system includes a means for reducing slack from the seat belt webbing when a significant deceleration of a vehicle is detected by an acceleration sensor.

34. The vehicle seat assembled with a seat belt system of claim 30 wherein the seat belt system includes a means for reducing the load placed on a seat occupant by the seat belt webbing during a crash when the rotatable spool has been locked against rotation.

\* \* \* \* \*